US010742862B2

(12) United States Patent
Ikeda et al.

(10) Patent No.: US 10,742,862 B2
(45) Date of Patent: Aug. 11, 2020

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Nobuho Ikeda, Kanagawa (JP); Hiroshi Ikeda, Tokyo (JP); Seijiro Inaba, Kanagawa (JP); Hideyuki Sato, Chiba (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 15/780,945

(22) PCT Filed: Sep. 29, 2016

(86) PCT No.: PCT/JP2016/078812
§ 371 (c)(1),
(2) Date: Jun. 1, 2018

(87) PCT Pub. No.: WO2017/110192
PCT Pub. Date: Jun. 29, 2017

(65) Prior Publication Data
US 2018/0288297 A1    Oct. 4, 2018

(30) Foreign Application Priority Data

Dec. 24, 2015    (JP) .................................. 2015-251343

(51) Int. Cl.
*H04N 5/232* (2006.01)
*H04N 17/00* (2006.01)
(Continued)

(52) U.S. Cl.
CPC ............. *H04N 5/232* (2013.01); *G03B 37/04* (2013.01); *G06T 7/0002* (2013.01);
(Continued)

(58) Field of Classification Search
CPC .. H04N 5/232; H04N 5/232061; H04N 5/247; G03B 37/04; G03B 43/00;
(Continued)

(56) References Cited

U.S. PATENT DOCUMENTS 10,079,979 B2 *    9/2018    Wedajo ................. H04N 5/2351
2001/0019363 A1 *  9/2001    Katta ..................... H04N 5/232
                                                                348/333.01
2015/0172539 A1 *  6/2015    Neglur ............... H04N 5/23206
                                                                348/207.1

FOREIGN PATENT DOCUMENTS

DE        60106997 T2      12/2005
EP         1134718 A2       9/2001
JP        2001-320616 A    11/2001

OTHER PUBLICATIONS

International Search Report and Written Opinion of PCT Application No. PCT/JP2016/078812, dated Nov. 22, 2016, 07 pages of ISRWO.

* cited by examiner

*Primary Examiner* — Twyler L Haskins
*Assistant Examiner* — Fayez Bhuiyan
(74) *Attorney, Agent, or Firm* — Chip Law Group

(57)    ABSTRACT

Provided is an information processing device including an adjustment value determination unit that determines a second image quality adjustment value of each of a plurality of cameras on a basis of a first image quality adjustment value of each of the plurality of cameras and a confidence level of each of the plurality of cameras that are acquired from each of the plurality of cameras.

17 Claims, 17 Drawing Sheets

(51) Int. Cl.
*G03B 37/04* (2006.01)
*G06T 7/00* (2017.01)
*H04N 5/247* (2006.01)
*G03B 43/00* (2006.01)

(52) U.S. Cl.
CPC ....... *H04N 5/232061* (2018.08); *H04N 5/247* (2013.01); *H04N 17/002* (2013.01); *G03B 43/00* (2013.01); *G06T 2207/10004* (2013.01); *G06T 2207/10024* (2013.01); *G06T 2207/30168* (2013.01)

(58) Field of Classification Search
CPC ......... G06T 7/0002; G06T 2207/10004; G06T 2207/10024; G06T 2207/30168
See application file for complete search history.

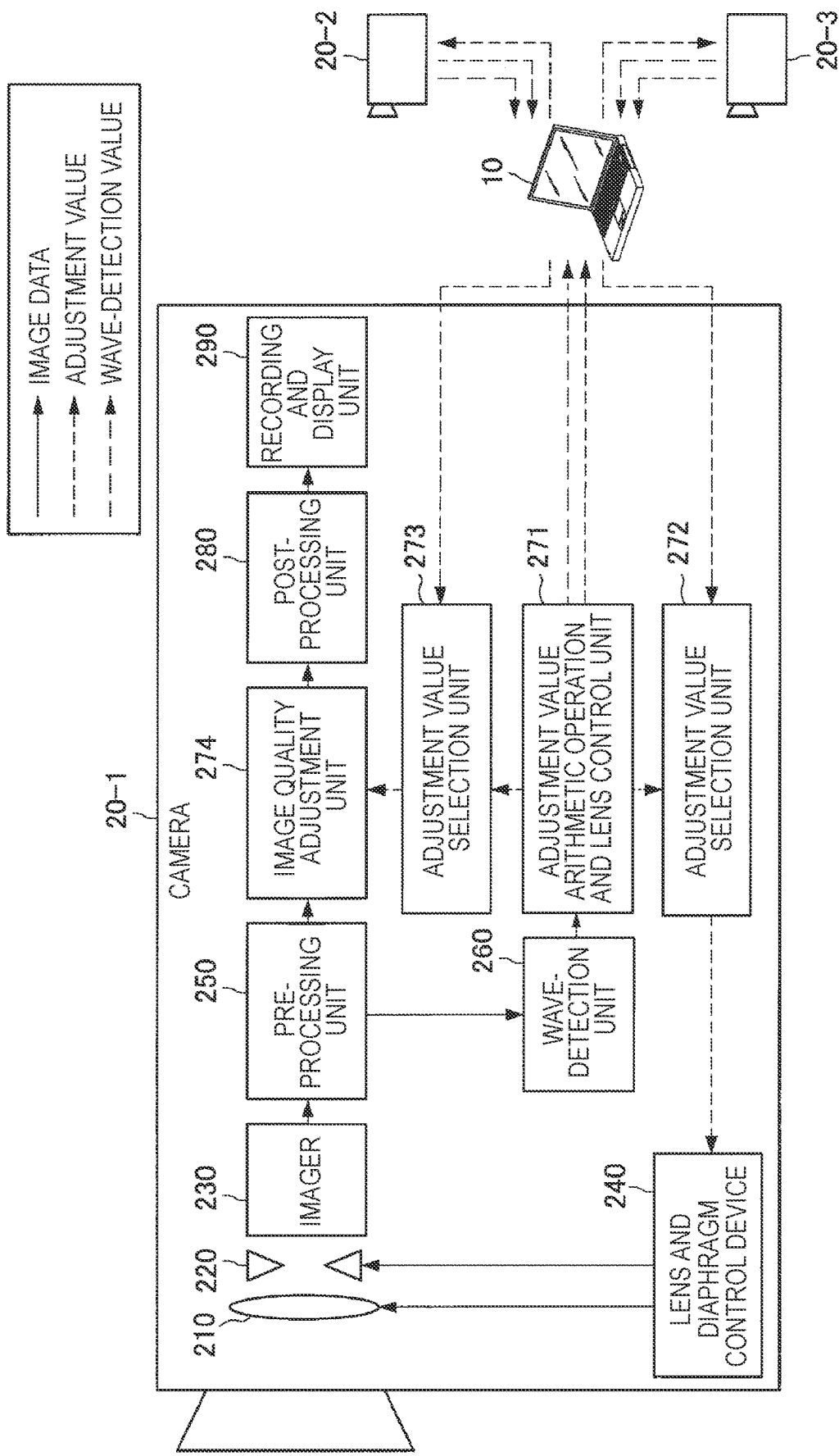

FIG. 3

| IMAGE QUALITY FACTOR | IMAGE QUALITY ADJUSTMENT ITEM | DYNAMIC/STATIC | PATTERN |
|---|---|---|---|
| COLOR | White Balance | DYNAMIC | ADJUSTMENT OF COEFFICIENT OF POLYNOMIAL FUNCTION |
| | MATRIX ARITHMETIC OPERATION | STATIC | MATRIX |
| BRIGHTNESS | APERTURE STOP | DYNAMIC/STATIC | ONLY COEFFICIENT OF LINEAR FUNCTION |
| | ISO SENSITIVITY | DYNAMIC/STATIC | ONLY COEFFICIENT OF LINEAR FUNCTION |
| | GAMMA CORRECTION | STATIC | EXPONENTIAL FUNCTION |
| | KNEE CORRECTION | DYNAMIC/STATIC | NON-CONTINUOUS FUNCTION |
| FEELING OF RESOLUTION | APERTURE STOP | DYNAMIC/STATIC | ONLY COEFFICIENT OF LINEAR FUNCTION |
| | CONTOUR EMPHASIS | STATIC | FILTER PROCESSING |
| FEELING OF NOISE/TEXTURE | Noise Reduction | DYNAMIC | DEDICATED ALGORITHM |

FIG. 5

| | CAMERA 20-1 (CONFIDENCE LEVEL: HIGH) | CAMERA 20-2 (CONFIDENCE LEVEL: LOW) | CAMERA 20-3 (CONFIDENCE LEVEL: LOW) | ... | CAMERA 20-N (CONFIDENCE LEVEL: LOW) |
|---|---|---|---|---|---|
| UNADJUSTED | A | B | C | ... | D |
| ADJUSTED | A | A | A | ... | A |

FIG. 8

|  |  | 1 | 2 | ... | N |
|---|---|---|---|---|---|
| UNADJUSTED | $W_r$ | $W_{r1}$ | $W_{r2}$ | ... | $W_{rN}$ |
|  | $W_g$ | $W_{g1}$ | $W_{g2}$ | ... | $W_{gN}$ |
|  | $W_b$ | $W_{b1}$ | $W_{b2}$ | ... | $W_{bN}$ |
| DETERMINATION RESULT |  | 1 | 0 | ... | 1 |
| ADJUSTED | $W_r$ | $W_{r1}$ | $W_{rave}$ | ... | $W_{rN}$ |
|  | $W_g$ | $W_{g1}$ | $W_{gave}$ | ... | $W_{gN}$ |
|  | $W_b$ | $W_{b1}$ | $W_{bave}$ | ... | $W_{bN}$ |

FIG. 13

| INPUT | OUTPUT A | OUTPUT B |
|---|---|---|
| y | f1[y] | f2[y] |
| 0 | 0 | 0 |
| 1 | 3 | 3 |
| 2 | 9 | 7 |
| 3 | 12 | 9 |
| ⋮ | ⋮ | ⋮ |
| 255 | 255 | 255 |

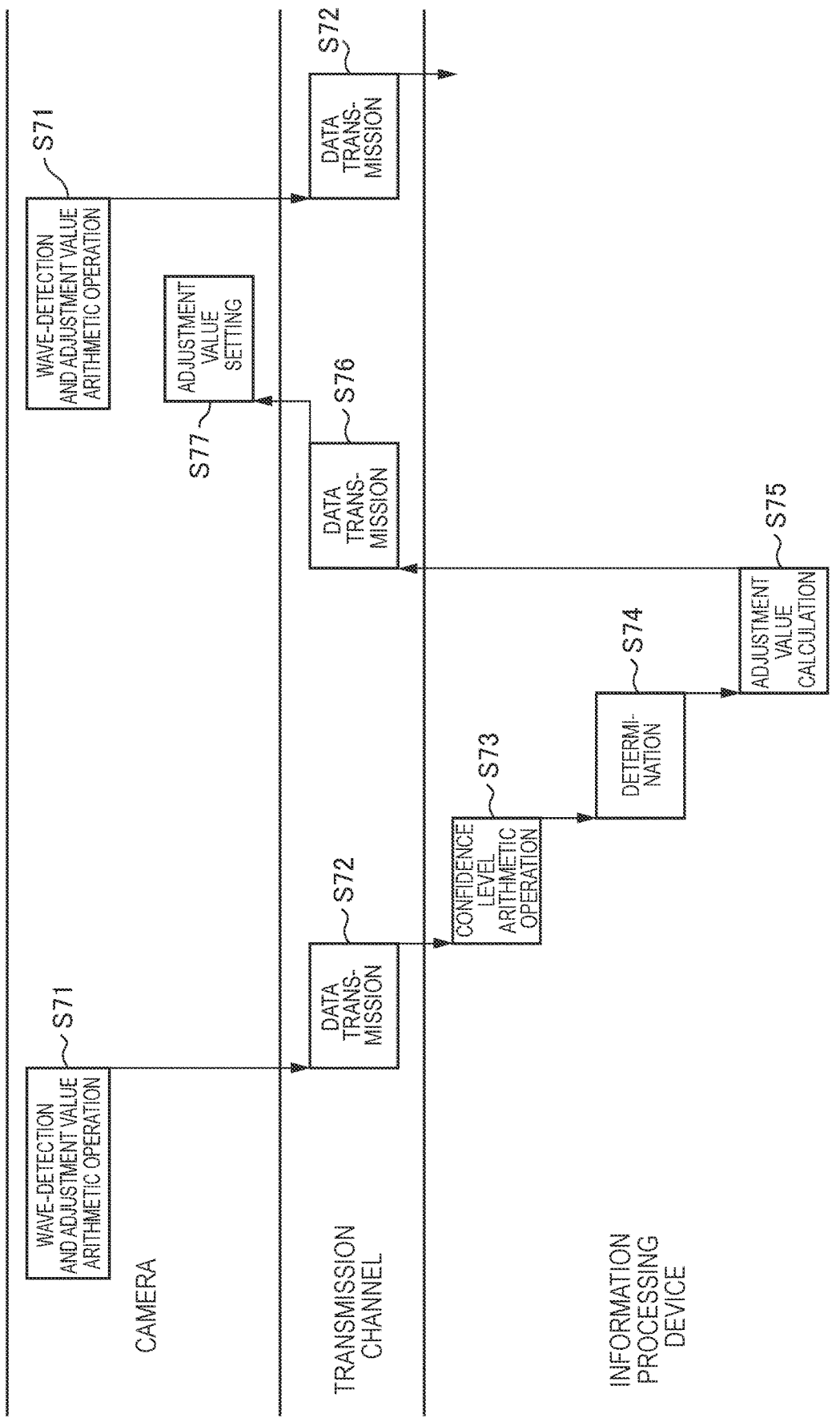

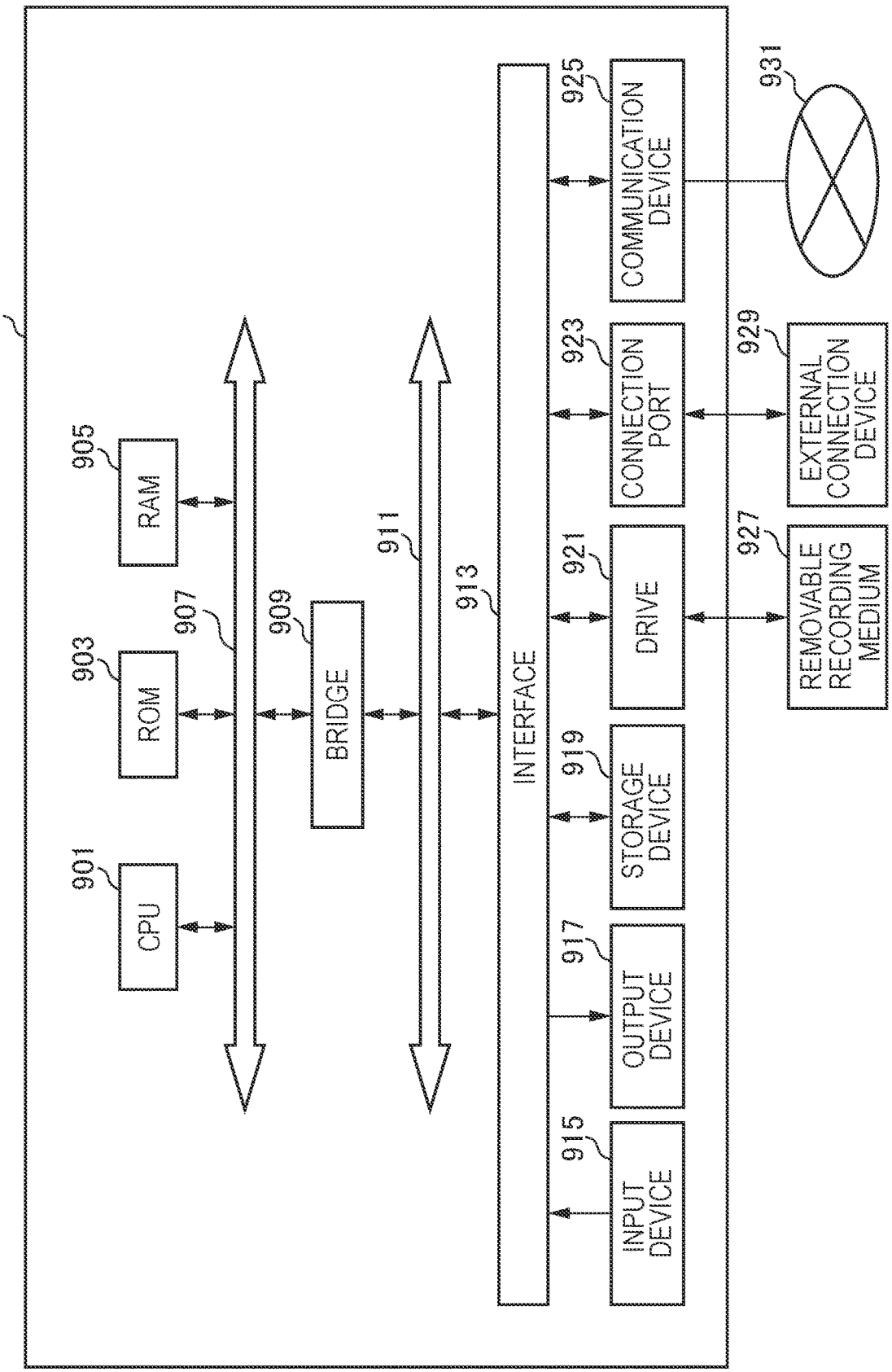

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2016/078812 filed on Sep. 29, 2016, which claims priority benefit of Japanese Patent Application No. JP 2015-251343 filed in the Japan Patent Office on Dec. 24, 2015. Each of the above-referenced applications is hereby incorporated herein by reference in its entirety.

TECHNICAL FIELD

The present disclosure relates to an information processing device, an information processing method, a program, and an information processing system.

BACKGROUND ART

Techniques of using an image captured by each of a plurality of cameras are known nowadays. In one example, a technique of synthesizing images captured by each of a plurality of cameras is disclosed (e.g., refer to Patent Literature 1). The image quality adjustment of each of the plurality of cameras is typically performed manually by the user or automatically for each camera independently.

CITATION LIST

Patent Literature

Patent Literature 1: JP 2004-242047A

DISCLOSURE OF INVENTION

Technical Problem

It is however desirable to provide a technique capable of improving the accuracy of image quality adjustment of each of a plurality of cameras.

Solution to Problem

According to the present disclosure, there is provided an information processing device including an adjustment value determination unit configured to determine a second image quality adjustment value of each of a plurality of cameras on a basis of a first image quality adjustment value of each of the plurality of cameras and a confidence level of each of the plurality of cameras that are acquired from each of the plurality of cameras.

According to the present disclosure, there is provided an information processing method including determining a second image quality adjustment value of each of a plurality of cameras on a basis of a first image quality adjustment value of each of the plurality of cameras and a confidence level of each of the plurality of cameras that are acquired from each of the plurality of cameras.

According to the present disclosure, there is provided a program causing a computer to function as an information processing device including an adjustment value determination unit configured to determine a second image quality adjustment value of each of a plurality of cameras on a basis of a first image quality adjustment value of each of the plurality of cameras and a confidence level of each of the plurality of cameras that are acquired from each of the plurality of cameras.

According to the present disclosure, there is provided an information processing system including: a plurality of cameras; and an information processing device including an adjustment value determination unit configured to determine a second image quality adjustment value of each of the plurality of cameras on a basis of a first image quality adjustment value of each of the plurality of cameras and a confidence level of each of the plurality of cameras that are acquired from each of the plurality of cameras.

ADVANTAGEOUS EFFECTS OF INVENTION

According to the present disclosure as described above, a technique capable of improving the accuracy of image quality adjustment of each of a plurality of cameras is provided. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 2 is a block diagram illustrating a functional configuration example of a camera according to the present embodiment.

FIG. 3 is a diagram illustrating an example of image quality adjustment.

FIG. 5 is a diagram illustrating an example of a relationship between the confidence level of each of a plurality of cameras and each of the unadjusted and adjusted image quality adjustment values.

FIG. 8 is a diagram illustrating an example of the correlation between a confidence level determination result and each of the unadjusted and adjusted image quality adjustment vectors.

FIG. 13 is a diagram illustrating an example of a function table obtained from each of different function forms.

FIG. 17 is a flowchart illustrating an example of an overall operation of an information processing system according to the second embodiment of the present disclosure.

FIG. 18 is a block diagram illustrating a hardware configuration example of an information processing device according to an embodiment of the present disclosure.

MODE(S) FOR CARRYING OUT THE INVENTION

Figure 1:
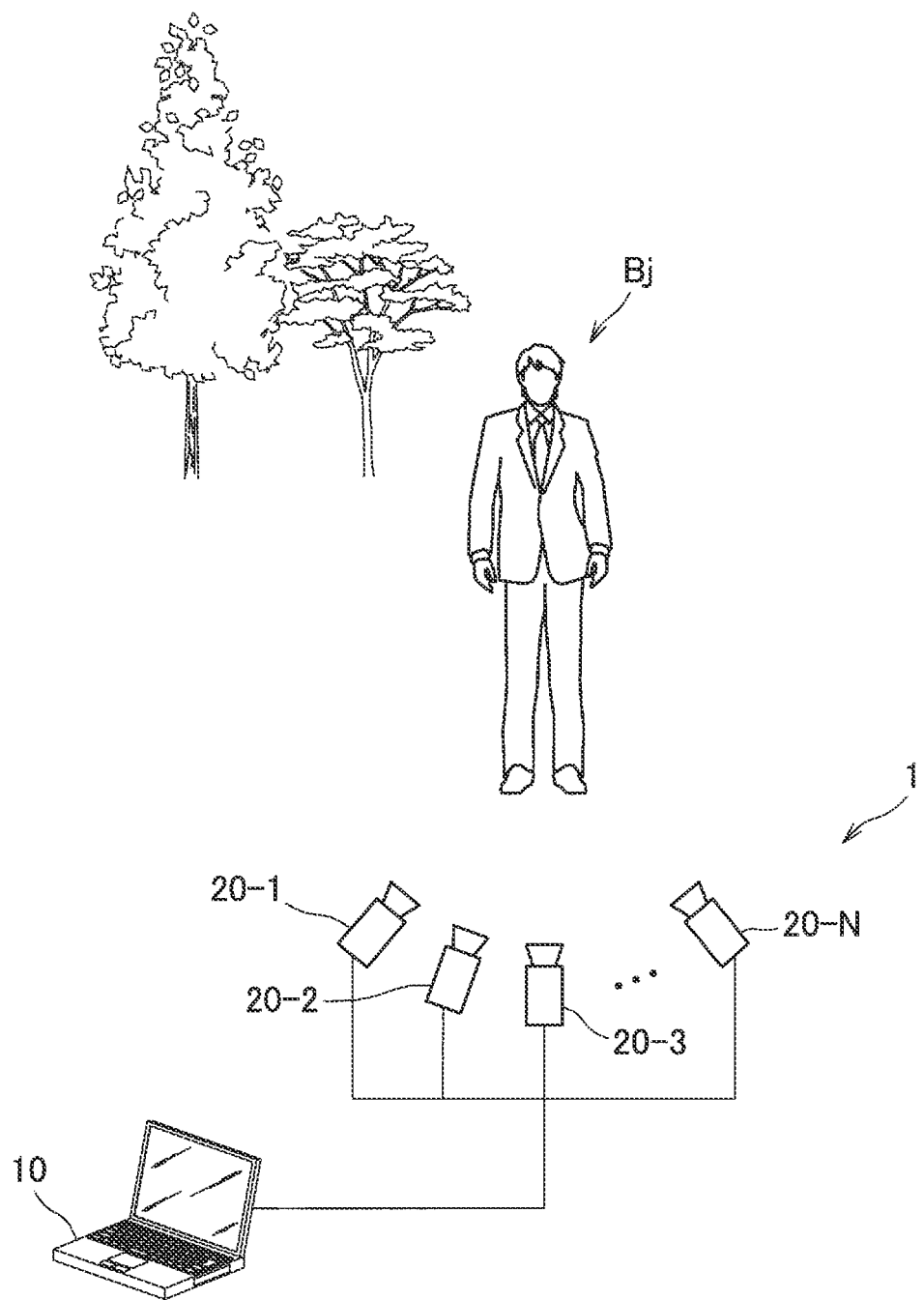
FIG. 1 is a diagram illustrating a configuration example of an information processing system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that, in this description and the drawings, structural elements that have substantially the same function and structure are sometimes distinguished from each other using different numbers after the same reference sign. However, when there is no need in particular to distinguish structural elements that have substantially the same function and structure, the same reference sign alone is attached.

Moreover, the description will be given in the following order.
0. Background
1. Embodiment of present disclosure
1.1. System configuration example
1.2. Functional configuration example
1.3. Example of image quality adjustment item
2. First embodiment
3. Second embodiment
4. Hardware configuration example
5. Concluding remarks

0. Background

The background of an embodiment of the present disclosure is now described. Techniques of using an image captured by each of a plurality of cameras are known nowadays. In one example, a technique for synthesizing images captured by a plurality of cameras is disclosed (e.g., refer to JP 2004-242047A). Here, in order to make the image captured by each of the plurality of cameras higher in quality, it is desirable to adjust the image quality of each of the plurality of cameras so that the image quality is uniform among the plurality of cameras. Examples of image quality include color, brightness, resolution, feeling of noise, and texture.

Various approaches are currently known for adjusting the image quality of each of a plurality of cameras. An approach is known, as a first approach, for adjusting the image quality of each of a plurality of cameras manually by a user. In other words, in the first approach, when the user manually adjusts the image quality of each of the plurality of cameras while visually checking the image captured by each of the plurality of cameras, an image quality adjustment value is used as a fixed value. In the first approach, however, if the brightness of an image capturing region of each of the plurality of cameras varies with the lapse of time or if the color of the illumination light entering the image capturing region varies, the image quality of each of the plurality of cameras will fluctuate, resulting in the deterioration of the image quality.

It is desirable to automatically adjust the image quality of each of the plurality of cameras to improve such situation. Thus, an approach is known, as a second approach, for performing independently and automatically the image quality adjustment of each of a plurality of cameras for each camera. In the second approach, however, the image quality will be deviated among the plurality of cameras, resulting in the deterioration of the image quality. Thus, in the present specification, technology capable of improving the accuracy of image quality adjustment of each of a plurality of cameras is provided as main technology.

1. Embodiment of Present Disclosure

1.1. System Configuration Example

Then, a configuration example of an information processing system according to an embodiment of the present disclosure is now described with reference to the drawings. FIG. 1 is a diagram illustrating a configuration example of an information processing system according to an embodiment of the present disclosure. As illustrated in FIG. 1, an information processing system 1 according to an embodiment of the present disclosure includes an information processing device 10 and cameras 20-1 to 20-N (where N is an integer ≥2). As illustrated in FIG. 1, in one example, the cameras 20-1 to 20-N capture the same subject Bj. This allows images of the same subject Bj captured at a plurality of different positions to be obtained. Moreover, in the example illustrated in FIG. 1, the subject Bj is a person, but the subject Bj may be a target object other than a person.

Further, the information processing device 10 and the cameras 20-1 to 20-N are capable of communicating with each other via a network (not shown). The information processing device 10 acquires, from the camera 20-1 via a network (not shown), an image quality adjustment value of the camera 20-1 (a first image quality adjustment value, hereinafter referred to as "unadjusted image quality adjustment value" to distinguish it from "adjusted image quality adjustment value") and adjusts the image quality adjustment value to acquire the adjusted image quality adjustment value (a second image quality adjustment value). Then, the information processing device 10 transmits the adjusted image quality adjustment value to the camera 20-1 to cause the image quality adjustment to be performed using the adjusted image quality adjustment value. The image quality adjustment is performed for the cameras 20-2 to 20-N using the procedure similar to that for the camera 20-1.

Moreover, in the example illustrated in FIG. 1, the information processing device 10 is arranged on the outside of the cameras 20-1 to 20-N, but the information processing device 10 may be arranged on the inside of some or all of the cameras 20-1 to 20-N. In addition, in the example illustrated in FIG. 1, the information processing device 10 is a notebook personal computer (PC), but the information processing device 10 is not limited to a notebook PC. In one example, the information processing device 10 may be a smartphone, a mobile phone, a tablet terminal, or a game machine.

The configuration example of the information processing system 1 according to the embodiment of the present disclosure is described above.

1.2. Functional Configuration Example

Then, the functions of the cameras 20-1 to 20-N according to the embodiment of the present disclosure are substantially similar to each other, and so an example of the functional configuration of the camera 20-1 is described as a representative of the cameras 20-1 to 20-N. FIG. 2 is a block diagram illustrating a functional configuration example of the camera 20-1 according to the present embodiment. As illustrated in FIG. 2, the camera 20-1 includes a lens 210, a diaphragm 220, an imager 230, a lens and diaphragm control device 240, a pre-processing unit 250, a wave-detection unit 260, an adjustment value arithmetic operation and lens control unit 271, an adjustment value selection unit 272, an adjustment value selection unit 273, an image quality adjustment unit 274, a post-processing unit 280, and a recording and display unit 290.

The lens 210 is an optical device that uses refractions to focus light. The diaphragm 220 is a mechanism for adjusting the amount of light entering the lens 210. The imager 230 is a semiconductor device that converts the light focused by the lens 210 into an electric signal. In one example, the imager 230 may be a charge-coupled device (CCD) or a complementary metal-oxide-semiconductor (COMS). The lens 210 and the diaphragm 220 can have an influence on the resolution of an image.

The pre-processing unit 250 performs processing for reducing manufacturing variations occurring between an image captured by a relevant camera and an image captured by another camera. In one example, the pre-processing unit 250 adjusts an image that is output from the imager 230 on the basis of a result obtained by measuring the image quality (e.g., brightness, color, or the like of an image) of the imager 230 under predetermined conditions. The wave-detection unit 260 performs wave-detection on the basis of the image capturing result that is output from the pre-processing unit 250.

The adjustment value arithmetic operation and lens control unit 271 calculates an unadjusted image quality adjustment value on the basis of a wave-detection value that is output from the wave-detection unit 260. Then, the adjustment value arithmetic operation and lens control unit 271 provides the information processing device 10 with the unadjusted image quality adjustment value and the wave-detection value obtained through wave-detection performed by the wave-detection unit 260 via a network (not shown). The information processing device 10, when receiving the unadjusted image quality adjustment value and the wave-detection value, calculates an adjusted image quality adjustment value on the basis of the received unadjusted image quality adjustment value and wave-detection value. Moreover, the calculation for obtaining the adjusted image quality adjustment value will be described later in detail.

Further, the adjustment value arithmetic operation and lens control unit 271 acquires the adjusted image quality adjustment value from the information processing device 10. In a case where the adjusted image quality adjustment value has relevance to control of the lens 210 or the diaphragm 220, the adjustment value arithmetic operation and lens control unit 271 outputs the adjusted image quality adjustment value to the adjustment value selection unit 272. On the other hand, in a case where the adjusted image quality adjustment value has relevance to image processing, the adjustment value arithmetic operation and lens control unit 271 outputs the adjusted image quality adjustment value to the adjustment value selection unit 273.

The adjustment value selection unit 272 selects either the adjustment value calculated by the adjustment value arithmetic operation and lens control unit 271 or the adjusted image quality adjustment value received from the information processing device 10. Then, the adjustment value selection unit 272 outputs the selection result to the lens and diaphragm control device 240. The lens and diaphragm control device 240 controls the lens 210 or the diaphragm 220 on the basis of the selection result output from the adjustment value selection unit 272. This control over the lens 210 or the diaphragm 220 allows the image quality to be indirectly adjusted. Moreover, in this specification, the control over the lens 210 or the diaphragm 220 can also be included in the image quality adjustment.

On the other hand, the adjustment value selection unit 273 selects either the adjustment value calculated by the adjustment value arithmetic operation and lens control unit 271 or the adjusted image quality adjustment value received from the information processing device 10. Then, the adjustment value selection unit 272 outputs the selection result to the image quality adjustment unit 274. The image quality adjustment unit 274 performs the image quality adjustment on the image output from the pre-processing unit 250 on the basis of the selection result output from the adjustment value selection unit 273. This adjustment of the image quality allows the image quality to be directly adjusted.

The post-processing unit 280 adjusts the size of an image to be output to the recording and display unit 290 located at the subsequent stage of the post-processing unit 280. In addition, the post-processing unit 280 performs the encoding for recording on an image to be output to the recording and display unit 290 located at the subsequent stage of the post-processing unit 280. In addition, the recording and display unit 290 records the image output from the post-processing unit 280 in a storage unit (not shown) or displays the image on a display unit (not shown).

The functional configuration example of the camera 20-1 according to the embodiment of the present disclosure is described above.

1.3. Example of Image Quality Adjustment Item

Then, an example of image quality adjustment items according to the embodiment of the present disclosure is described. FIG. 3 is a diagram illustrating an example of the image quality adjustment. As illustrated in FIG. 3, in the embodiment of the present disclosure, color, brightness, feeling of resolution, feeling of noise (or texture), or the like is used as an image quality factor. It is conceivable that, as an image quality adjustment item for adjusting the image quality factor "color", white balance, matrix arithmetic operation, or the like is used.

Further, it is conceivable that, as an image quality adjustment item for adjusting the image quality factor "brightness", aperture stop, ISO sensitivity, gamma correction, knee correction, or the like is used. It is conceivable that, as an image quality adjustment item for adjusting the image quality factor "feeling of resolution", aperture stop, contour emphasis, or the like is used. It is conceivable that, as an image quality adjustment item for adjusting the image quality factor "feeling of noise/texture", noise reduction or the like is used.

Thus, the uncorrected image quality adjustment value may include values regarding at least any one of white balance, matrix arithmetic operation, aperture stop, gain, gamma correction, knee correction, contour emphasis, and noise reduction of the image captured by the camera. Similarly, the adjusted image quality adjustment value may include a value regarding at least any one of white balance, matrix arithmetic operation, aperture stop, gain, gamma correction, knee correction, contour emphasis, and noise reduction of the image captured by the camera.

Further, as illustrated in FIG. 3, it is conceivable that, as the type (dynamic/static) of the image quality adjustment, the type of image quality adjustment depending on the temporal change of the image capturing region and the type of image quality adjustment in accordance with the user's instruction are used. In the present specification, sometimes, the former is referred to as dynamic image quality adjustment (described as "dynamic" in FIG. 3) and the latter is referred to as static image quality adjustment (described as "static" in FIG. 3). The correlation between the image quality adjustment item illustrated in FIG. 3 and the type (dynamic/static) of the image quality adjustment is merely an example, and the correlation between the image quality adjustment item and the type of image quality adjustment (dynamic/static) is not limited to the example illustrated in FIG. 3.

In the present embodiment, an adjustment value determination unit 130A (FIG. 4) determines an adjusted image quality adjustment value for each of the plurality of cameras on the basis of the unadjusted image quality adjustment value of each of the plurality of cameras and the confidence level of each of the plurality of cameras. This makes it possible to improve the accuracy of the image quality adjustment of each of the plurality of cameras. In this event, as illustrated in FIG. 3, the image quality adjustment of each image quality adjustment item (e.g., determination or the like of an adjusted image quality adjustment value corresponding to each of the confidence level of each of the plurality of cameras, the threshold to be compared with the confidence level, and the comparison result) are classified into several patterns and can be performed for each pattern. Moreover, the correlation between the image quality adjustment item and the pattern illustrated in FIG. 3 is merely an example, and the correlation between the image quality adjustment item and the pattern is also not limited to the example illustrated in FIG. 3.

2. First Embodiment

Figure 4:
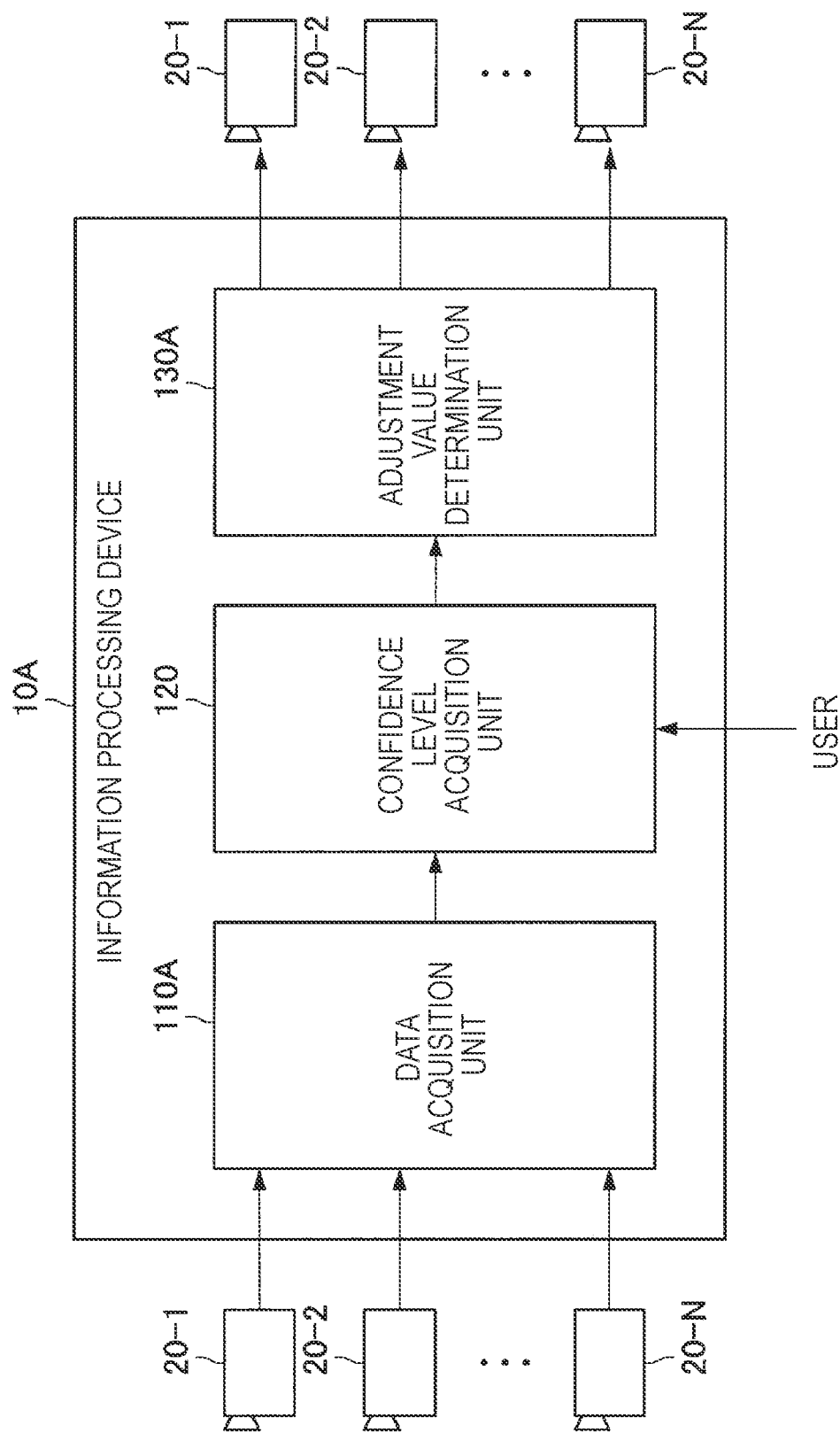
FIG. 4 is a block diagram illustrating a functional configuration example of an information processing device according to a first embodiment of the present disclosure.

Then, a first embodiment of the present disclosure is described. The first embodiment of the present disclosure corresponds to the static image quality adjustment described above. FIG. 4 is a block diagram illustrating a functional configuration example of an information processing device according to the first embodiment of the present disclosure. As illustrated in FIG. 4, an information processing device 10A according to the first embodiment of the present disclosure includes a data acquisition unit 110A, a confidence level acquisition unit 120, and an adjustment value determination unit 130A. In addition, as illustrated in FIG. 4, the information processing device 10A is connected to the cameras 20-1 to 20-N via a network (not shown).

Here, the static image quality adjustment is image quality adjustment in which the user's intention is incorporated more strongly, as compared to the case where the image quality adjustment is automatically performed by the camera. Thus, it is natural for the user to set the adjusted image quality adjustment value of each of the cameras 20-1 to 20-N to an image quality adjustment value of a camera (a reference camera) whose confidence level selected by the user is "high". Thus, in the static image quality adjustment, the image quality adjustment value of another camera is adjusted to the image quality adjustment value of the camera whose confidence level is "high".

The data acquisition unit 110A first acquires images from the cameras 20-1 to 20-N. In addition, the confidence level acquisition unit 120 acquires a confidence level of each of the cameras 20-1 to 20-N. In one example, the confidence level acquisition unit 120 acquires the confidence level of each of the cameras 20-1 to 20-N, which is specified by the user. The adjustment value determination unit 130A determines the unadjusted image quality adjustment value of the camera having the highest confidence level as the adjusted image quality adjustment value of each of the cameras 20-1 to 20-N.

FIG. 5 is a diagram illustrating an example of the relationship between the confidence level of each of the cameras 20-1 to 20-N and each of the unadjusted and adjusted image quality adjustment values. Referring to FIG. 5, "high" is specified as the confidence level of the camera 20-1 by the user, and "low" is specified as the confidence level of each of the cameras 20-2 to 20-N by the user. Thus, as illustrated in FIG. 5, the adjustment value determination unit 130A determines the adjusted image quality adjustment value of each of the cameras 20-2 to 20-N as the unadjusted image quality adjustment value of the camera 20-1 having the highest confidence level.

The adjusted image quality adjustment value of each of the cameras 20-1 to 20-N that is determined by the adjustment value determination unit 130A is transmitted to each of the cameras 20-1 to 20-N. In the cameras 20-1 to 20-N, the image quality adjustment is performed on the basis of the adjusted image quality adjustment value received from the information processing device 10A. This makes it possible to set the image quality adjustment value of each of the cameras 20-1 to 20-N to the image quality adjustment value of the camera 20-1, thereby improving the accuracy of image quality adjustment of each of the cameras 20-1 to 20-N.

3. Second Embodiment

Figure 6:
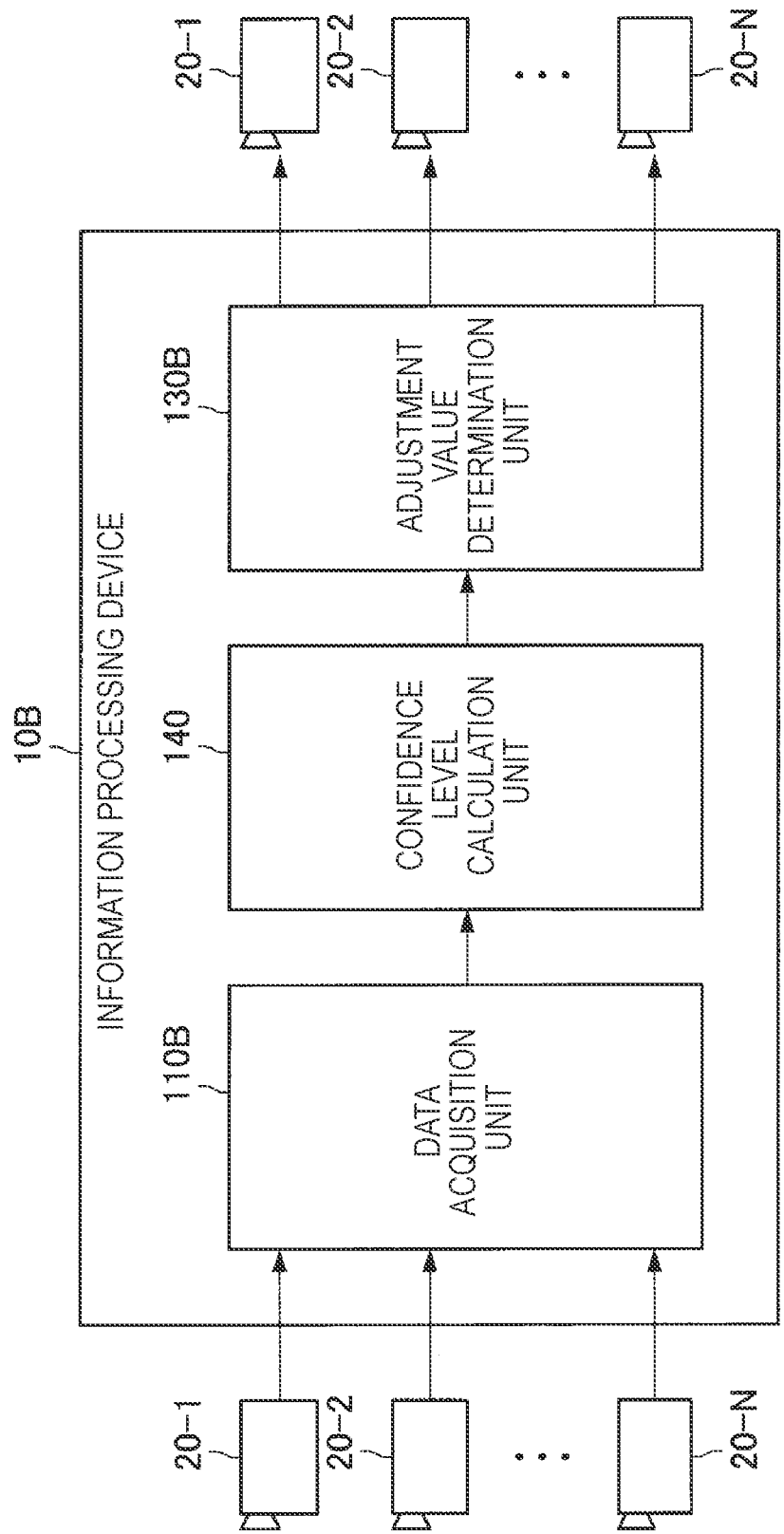
FIG. 6 is a block diagram illustrating a functional configuration example of an information processing device according to a second embodiment of the present disclosure.

Then, a second embodiment of the present disclosure is described. The second embodiment of the present disclosure corresponds to the dynamic image quality adjustment described above. FIG. 6 is a block diagram illustrating a functional configuration example of an information processing device according to the second embodiment of the present disclosure. As illustrated in FIG. 6, an information processing device 10B according to the second embodiment of the present disclosure includes a data acquisition unit 110B, a confidence level calculation unit 140, and an adjustment value determination unit 130B. In addition, as illustrated in FIG. 6, the information processing device 10B is connected to the cameras 20-1 to 20-N via a network (not shown).

The data acquisition unit 110B first acquires either one or both of the image and the wave-detection value from each of the cameras 20-1 to 20-N. In addition, the confidence level calculation unit 140 calculates the confidence level of each of the cameras 20-1 to 20-N. In one example, the confidence level calculation unit 140 calculates the confidence level of the camera 20-1 on the basis of the unadjusted image quality adjustment value of the camera 20-1. Similarly, the confidence level calculation unit 140 calculates the confidence level of each of the cameras 20-2 to 20-N.

An approach for calculating the confidence level is not particularly limited. In one example, the confidence level calculation unit 140 may calculate, for each camera, a difference value between the unadjusted image quality adjustment value and a predetermined reference adjustment value as the confidence level. In this case, the closer to the reference adjustment value, the higher the confidence level but the smaller the confidence level value. In addition, the reference adjustment value is also not particularly limited. In one example, the reference adjustment value may be a predetermined representative value regarding one or a plurality of cameras excluding the camera using the reference adjustment value for calculating the confidence level among the cameras 20-1 to 20-N (hereinafter also referred to as "other cameras than the relevant camera").

The representative value is also not particularly limited. In an example, the representative value may be an intermediate value, an average value, a minimum value, or a maximum value regarding other cameras than the relevant camera among the cameras 20-1 to 20-N. Alternatively, the representative value may be an intermediate value, an average value, a minimum value, or a maximum value regarding the cameras 20-1 to 20-N.

Further, the adjustment value determination unit 130B determines the adjusted image quality adjustment value of the camera 20-1 on the basis of the confidence level of the camera 20-1. More specifically, in a case where the confidence level exceeds a predetermined threshold (Thresh), the adjustment value determination unit 130B determines the adjusted image quality adjustment value as the reference adjustment value. On the other hand, in a case where the difference value does not exceed the threshold (Thresh), the adjustment value determination unit 130B determines the adjusted image quality adjustment value as the unadjusted image quality adjustment value. Similarly, the adjustment value determination unit 130B determines the adjusted image quality adjustment value of each of the cameras 20-1 to 20-N.

The adjusted image quality adjustment value of each of the cameras 20-1 to 20-N that is determined by the adjustment value determination unit 130B is transmitted to each of the cameras 20-1 to 20-N. In the cameras 20-1 to 20-N, the image quality adjustment is performed on the basis of the adjusted image quality adjustment value received from the information processing device 10B. This makes it possible to set the image quality adjustment value of each of the cameras 20-1 to 20-N to the image quality adjustment value of the camera 20-1, thereby improving the accuracy of image quality adjustment of each of the cameras 20-1 to 20-N.

Figure 7:
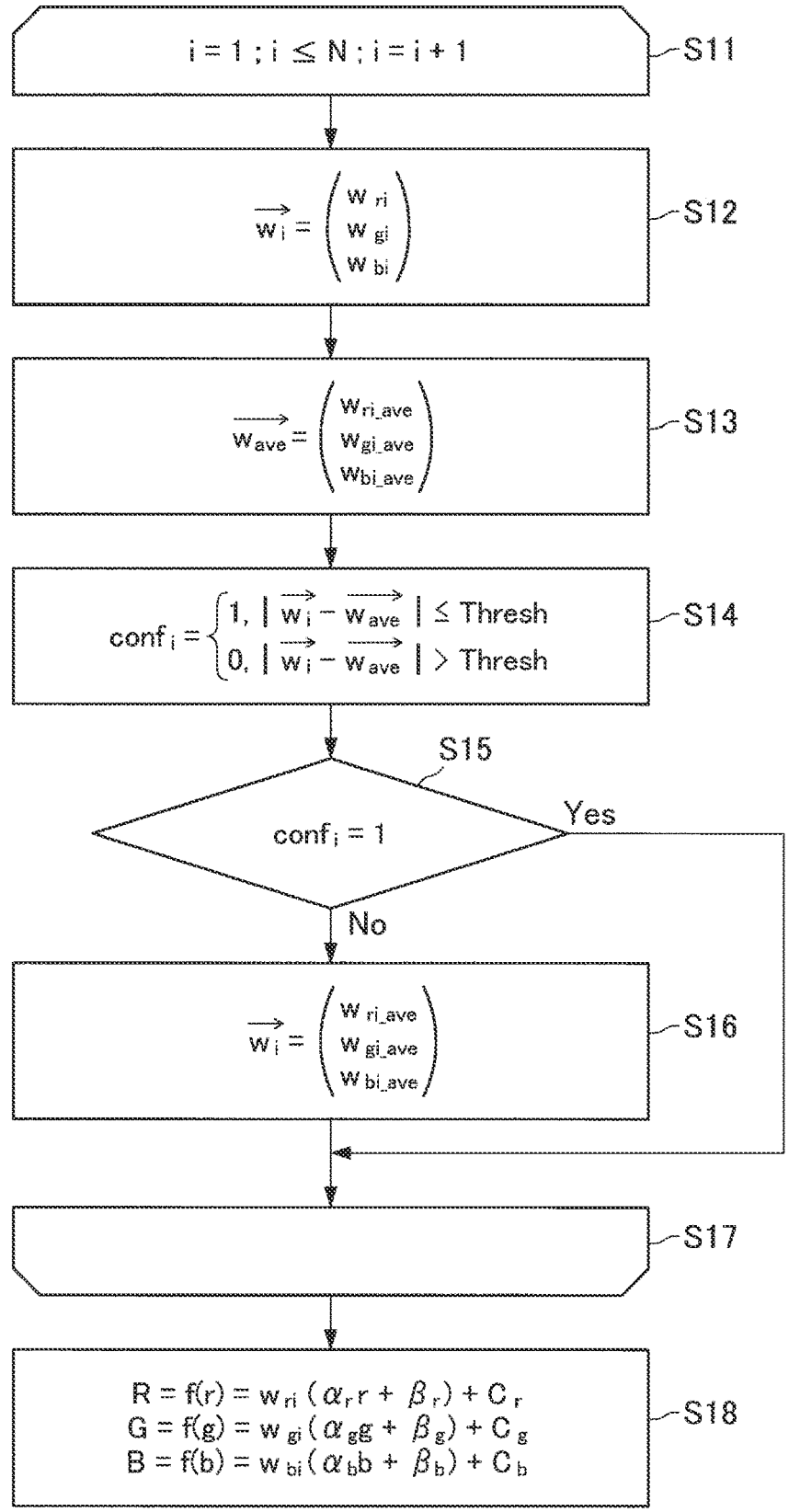
FIG. 7 is a flowchart illustrating a procedure of an operation of determining an adjusted image quality adjustment value in a case of performing white balance as an image quality adjustment item (case of performing adjustment of a coefficient of a polynomial function as an image quality adjustment pattern).

The description is now given as a specific example. In a first example, a case of performing the white balance as the image quality adjustment item (case of performing adjustment of a coefficient of a polynomial function as the image quality adjustment pattern) (see FIG. 3) is described. FIG. 7 is a flowchart illustrating the procedure of the operation of determining an adjusted image quality adjustment value in the case of performing the white balance as the image quality adjustment item (case of performing adjustment of a coefficient of a polynomial function as the image quality adjustment pattern).

Here, $W_r$, $W_g$, and $W_b$ are gains (image quality adjustment values) determined by image-wave-detection, $C_r$, $C_g$, and $C_b$ are offsets determined by image-wave-detection, $\alpha_r$, $\alpha_g$, and $\alpha_b$ are correction gains due to manufacturing variations, and $\beta_r$, $\beta_g$, and $\beta_b$ are correction offsets due to manufacturing variations. In addition, r, g, and b are signal values detected in the imager, and R, G, and B are signal values after the white balance is performed. Here, the white balance gain can be expressed by the univariate function y=f(x) capable of calculating one output variable for one input variable.

First, a variable i is set to 1 at the start of the iterative processing of S1 to S17. In addition, the continuation condition of the iterative processing that i is less than or equal to N is set. In addition, the termination process of the iterative processing of incrementing i by 1 is set (S11). The image quality adjustment vector $W_i$ is set to $(W_{ri}, W_{gi}, W_{bi})$ (S12), and a vector $W_{ave}$ indicating the average value regarding the other cameras than the relevant camera is set to $(W_{ri\_ave}, W_{gi\_ave}, W_{bi\_ave})$ (S13).

In the case where the difference value between the image quality adjustment vector $W_i$ and the vector $W_{ave}$ is less than or equal to a threshold, the confidence level calculation unit 140 sets a variable $conf_i$ to 1, and in a case where the difference value exceeds the threshold, sets the variable $conf_i$ to 0 (S14). In the case where the $conf_i$ is set to 1 ("Yes" in S15), the adjustment value determination unit 130B causes the operation to proceed to S17. On the other hand, in the case where the $conf_i$ is set to 0 ("No" in S15), the adjustment value determination unit 130B updates the image quality adjustment vector $W_i$ to the vector $W_{ave}$ (S16), and then causes the operation to proceed to S17.

When the operation proceeds to S17, i is incremented by 1, and if the continuation condition of the iterative processing that i is less than or equal to N is satisfied, the operation proceeds to S12. On the other hand, if the continuation condition of the iterative processing that i is less than or equal to N is not satisfied, the operation proceeds to S18. Then, R, G, and B that are signal values after the white balance is performed are obtained by a function using the image quality adjustment vector $W_i$ as a coefficient (S18).

FIG. 8 is a diagram illustrating an example of the correlation between the confidence level determination result ($conf_i$) and each of the unadjusted and adjusted the image quality adjustment vectors $W_i$ ($W_r$, $W_g$, and $W_b$). Referring to FIG. 8, in a case where i is 1, the determination result ($conf_1$) is 1 (the difference value between the image quality adjustment vector $W_i$ and the vector $W_{ave}$ is less than or equal to the threshold), and so the image quality adjustment vector $W_i$ is not changed before and after the adjustment. On the other hand, in a case where i is 2, the determination result ($conf_2$) is 0 (the difference value between the image quality adjustment vector $W_i$ and the vector $W_{ave}$ exceeds the threshold), and so the image quality adjustment vector $W_i$ is updated to the vector $W_{ave}$.

Figure 9:
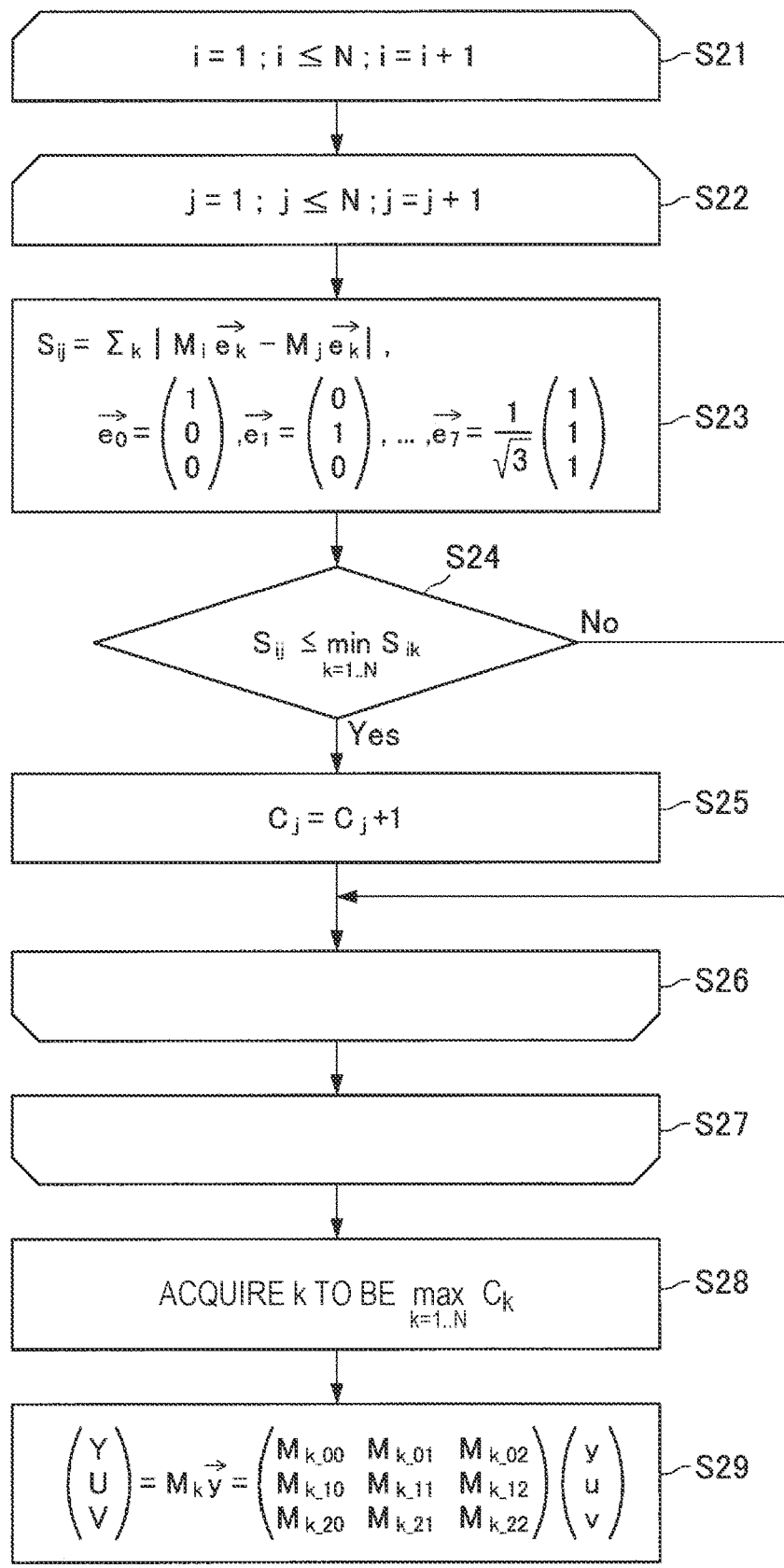
FIG. 9 is a flowchart illustrating a procedure of an operation of determining an adjusted image quality adjustment value in a case of updating a matrix arithmetic operation as an image quality adjustment item (case of performing a matrix arithmetic operation as an image quality adjustment pattern).

Then, in a second example, a case of updating the matrix arithmetic operation as the image quality adjustment item (case of performing the matrix arithmetic operation as the image quality adjustment pattern) (see FIG. 3) is described. FIG. 9 is a flowchart illustrating the procedure of the operation of determining the adjusted image quality adjustment value in the case of updating the matrix arithmetic operation as the image quality adjustment item (case of performing the matrix arithmetic operation as the image quality adjustment pattern).

Here, the vector y=(y, u, v) is a signal value detected in the imager, and y represents the luminance, u represents the color and saturation of the blue system, and v represents the color and saturation of the red system is a signal value after the matrix arithmetic operation is updated, Y represents the luminance, U represents the color and saturation of the blue system, and V represents the color and saturation of the red system. The matrix M is a matrix for transforming the vector y=(y, u, v) into the vector Y (Y, U, V).

In this manner, in a case where the unadjusted image quality adjustment value is given as a plurality of matrices M, in one example, the confidence level calculation unit 140 may calculate a confidence level $S_{ij}$ by calculating the difference value between results, which are obtained by multiplying the matrix M by a predetermined vector (e.g., unit vector $e_0=(1, 0, 0)$, $e_0=(0, 1, 0)$ to $e_7=(1, 1, 1)^{-1/3}$, etc.), for all combinations of the matrices M. Then, the adjustment value determination unit 130B may extract the minimum j in each column from the confidence level $S_{ij}$, acquire the value of j that is the largest number from the extraction result as k, and set $M_k$ as a matrix that gives the adjusted image quality adjustment value.

First, at the start of the iterative processing of S21 to S27, the variable i is set to 1. In addition, the continuation condition of the iterative processing that i is less than or equal to N is set. In addition, the termination process of the iterative processing of incrementing i by 1 is set (S21). Subsequently, a variable j is set to 1 at the start of the iterative processing of S22 to S26. In addition, the continuation condition of the iterative processing that j is less than or equal to N is set. In addition, the termination process of the iterative processing of incrementing j by 1 is set (S22).

Then, the confidence level calculation unit 140 calculates a value, which is obtained by summing the difference value between multiplication results with a predetermined vector (e.g., unit vector $e_0=(1, 0, 0)$, $e_0=(0, 1, 0)$ to $e_7=(1, 1, 1)^{-1/3}$, etc.) from 1 to N between the matrix $M_i$ and the matrix as the confidence level $S_{ij}$ (S23). In a case where the confidence level $S_{ij}$ is less than or equal to the minimum value of $S_{ik}$ from k=1 to N (S24), the adjustment value determination unit 130B increments $C_j$ by 1 (S25) and causes the operation to proceeds to S26.

When the operation proceeds to S26, j is incremented by 1, and if the continuation condition of the iterative processing that j is less than or equal to N is satisfied, the operation proceeds to S23. On the other hand, if the continuation condition of the iterative processing that i is less than or equal to N is not satisfied, the operation proceeds to S27. When the operation proceeds to S27, i is incremented by 1, and if the continuation condition of the iterative processing that i is less than or equal to N is satisfied, the operation proceeds to S22. On the other hand, if the continuation condition of the iterative processing that i is less than or equal to N is not satisfied, the operation proceeds to S28.

Figure 10:
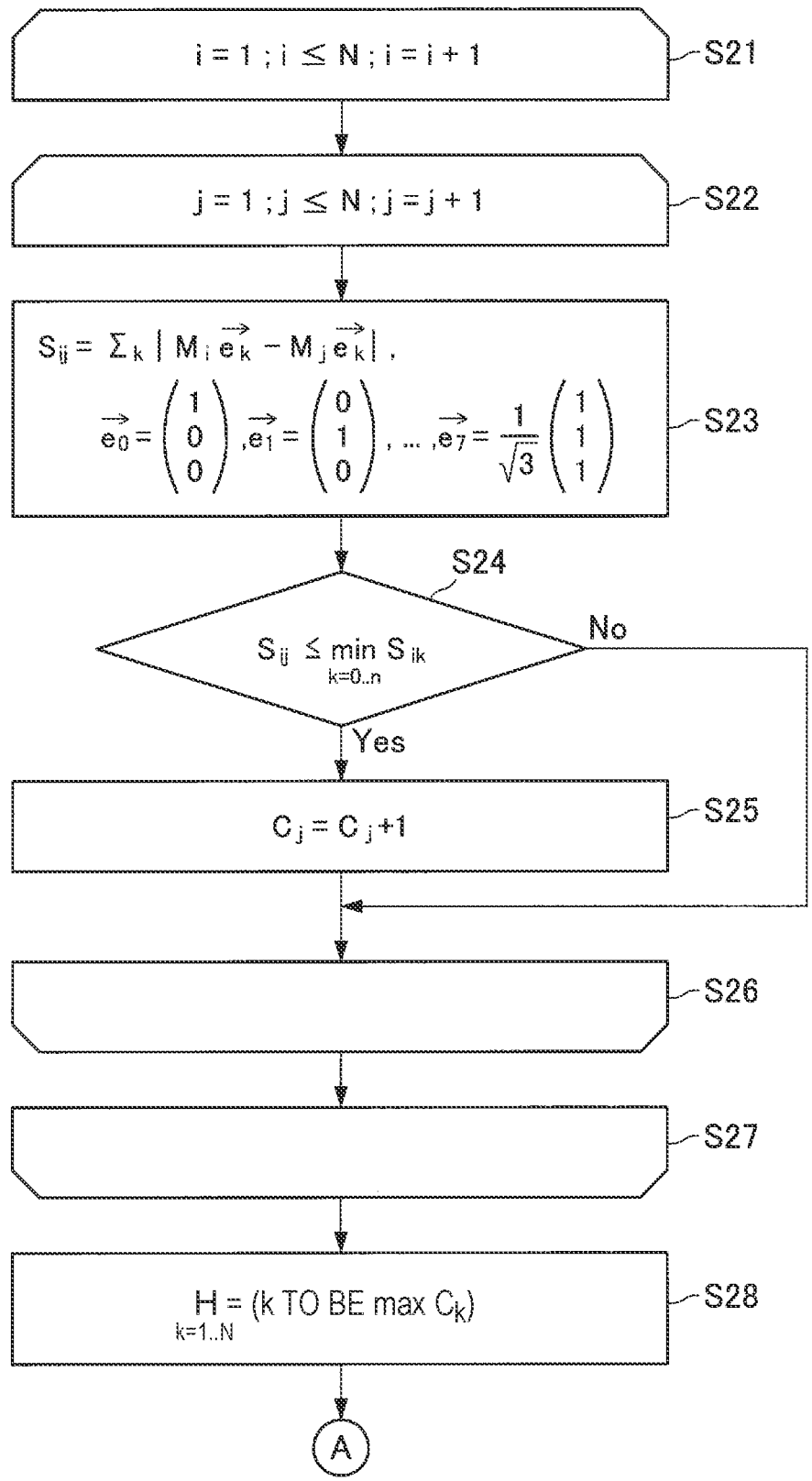
FIG. 10 is a flowchart illustrating a procedure of an operation (modified example) of determining an adjusted image quality adjustment value in the case of updating a matrix arithmetic operation as an image quality adjustment item (case of performing a matrix arithmetic operation as an image quality adjustment pattern).
Figure 11:
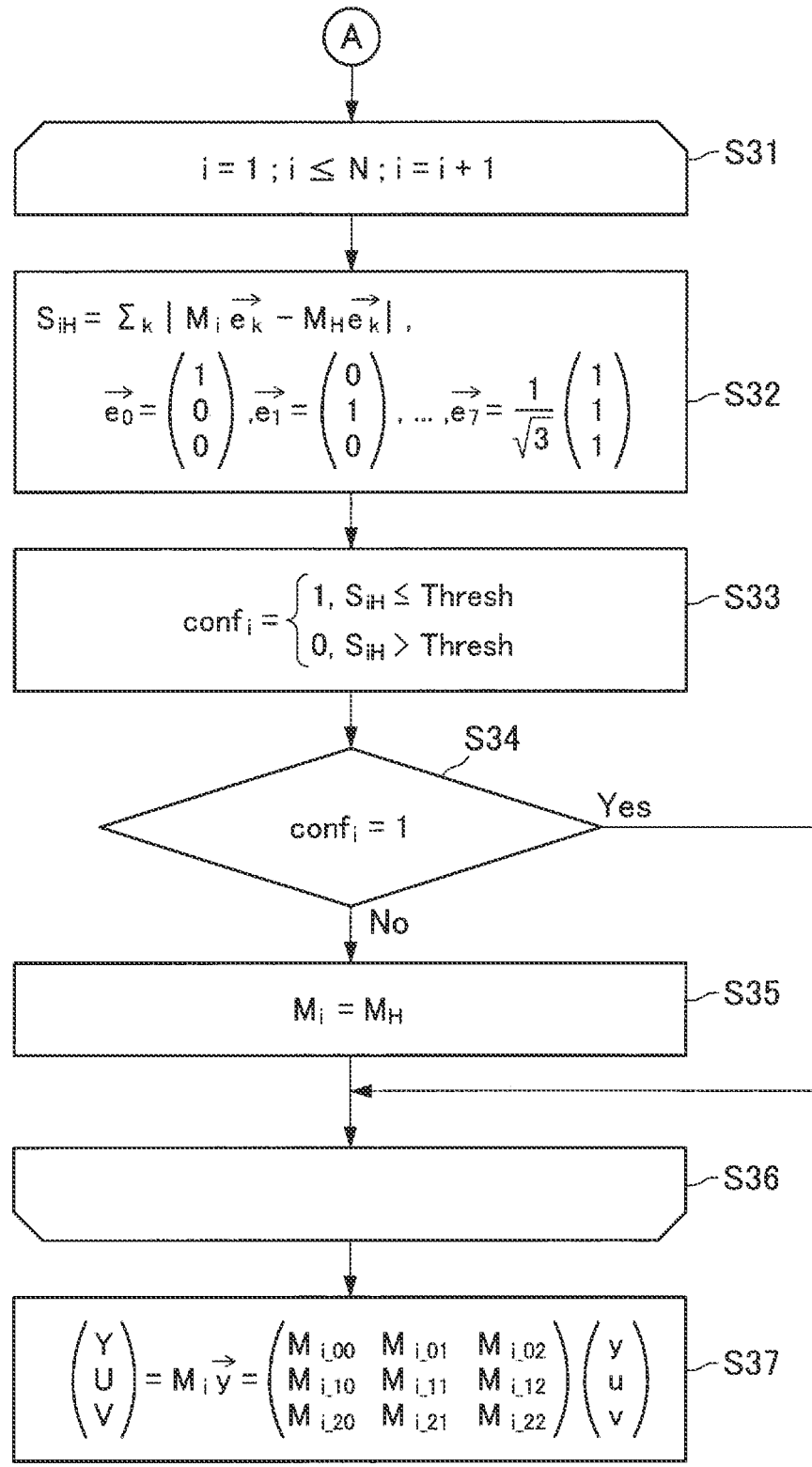
FIG. 11 is a flowchart illustrating a procedure of an operation (modified example) of determining an adjusted image quality adjustment value in the case of updating a matrix arithmetic operation as an image quality adjustment item (case of performing a matrix arithmetic operation as an image quality adjustment pattern).

Then, the adjustment value determination unit 130B acquires the maximum value between $C_1$ and $C_N$ as k (S28). Then, Y, U, and V that are signal values after matrix arithmetic operation is updated are obtained by the matrix $M_k$ (S29). This matrix $M_k$ is applied to all of the cameras 20-1 to 20-N, so it is transmitted from the information processing device 10B to all of the cameras 20-1 to 20-N, and it is used for the image quality adjustment in all of the cameras 20-1 to 20-N The maximum value between $C_1$ and $C_N$ obtained in this manner may be used as the reference adjustment value. This example is described as a modified example of the second example. FIGS. 10 and 11 are flowcharts illustrating the procedure of the operation (modified example) of determining the adjusted image quality adjustment value in the case of updating the matrix arithmetic operation as the image quality adjustment item (case of performing the matrix arithmetic operation as the image quality adjustment pattern). The operations from S21 to S27 are executed similarly to the operations from S21 to S27 illustrated in FIG. 9.

Then, the maximum value k between $C_1$ and $C_N$ is acquired as H (S28). Subsequently, the variable i is set to 1 at the start of the iterative processing of S31 to S36. In addition, the continuation condition of the iterative processing that i is less than or equal to N is set. In addition, the termination process of the iterative processing of incrementing i by 1 is set (S31).

Then, the confidence level calculation unit 140 calculates a value, which is obtained by summing the difference value between multiplication results with a predetermined vector (e.g., unit vector $e_0=(1, 0, 0)$, $e_0=(0, 1, 0)$ to $e_7=(1, 1, 1)^{-1/3}$, etc.) from 1 to N between the matrix $M_i$ and the matrix $M_H$, as the confidence level $S_{iH}$(S32).

In a case where the confidence level $S_{iH}$ is less than or equal to the threshold, the confidence level calculation unit 140 sets the variable $conf_i$ to 1, while in a case where the confidence level $S_{iH}$ exceeds the threshold, sets the variable $conf_i$ to 0 (S33). In the case where $conf_i$ is set to 1 ("Yes" in S34), the adjustment value determination unit 130B causes the operation to proceed to S36. On the other hand, in the case where $conf_i$ is set to 0 ("No" in S34), the adjustment value determination unit 130B updates the matrix $M_i$ to the matrix $M_H$ (S35), and causes the operation to proceed to S36.

When the operation proceeds to S36, i is incremented by 1, and if the continuation condition of the iterative processing that i is less than or equal to N is satisfied, the operation proceeds to S32. On the other hand, if the continuation condition of the iterative processing that i is less than or equal to N is not satisfied, the operation proceeds to S37. Then, Y, U, and V that are the signal values after the matrix arithmetic operation is updated are obtained by the matrix $M_i$ (S37). This matrix $M_i$ is a matrix for each camera, so it is used for the image quality adjustment in each of the cameras 20-1 to 20-N.

Figure 12:
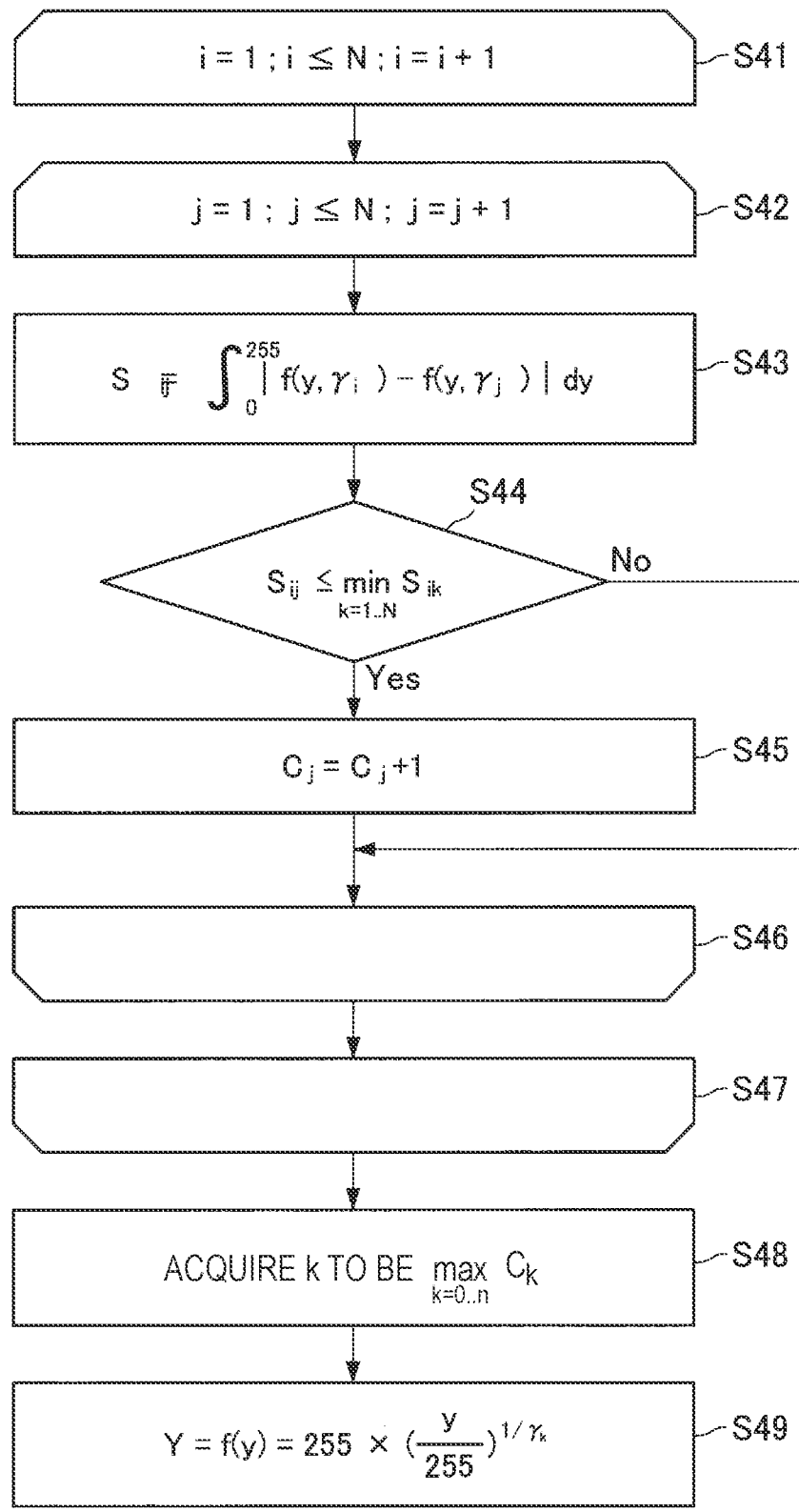
FIG. 12 is a flowchart illustrating a procedure of an operation of determining an adjusted image quality adjustment value in a case of performing gamma correction as an image quality adjustment item (case of performing image quality adjustment using an exponential function as an image quality adjustment pattern).

Then, in a third example, a case of performing the gamma correction as the image quality adjustment item (case of performing the image quality adjustment using an exponential function as the image quality adjustment pattern) (see FIG. 3) is described. FIG. 12 is a flowchart illustrating the procedure of the operation of determining the adjusted image quality adjustment value in the case of performing the gamma correction as the image quality adjustment item (case of performing the image quality adjustment using the exponential function as the image quality adjustment pattern).

Here, y represents the luminance out of the signal values detected in the imager. In addition, γ is an image quality adjustment value for adjusting the luminance. The function f is a function that outputs the luminance after changing the luminance y and the image quality adjustment value γ as input values. In this manner, in a case where the unadjusted image quality adjustment value is given as a plurality of functions f, the confidence level calculation unit 140 may calculate the confidence level $S_{ij}$ by calculating an integral value of the difference values between the functions f for all the combinations of the functions f. Then, the adjustment value determination unit 130B may extract the minimum j in each column from the confidence level $S_{ij}$, acquire the value of j that is the largest number from the extraction result as k, and set $f_k$ as a function that gives the adjusted image quality adjustment value.

First, the variable i is set to 1 at the start of the iterative processing of S41 to S47. In addition, the continuation condition of the iterative processing that i is less than or equal to N is set. In addition, the termination process of the iterative processing of incrementing i by 1 is set (S41). Subsequently, the variable j is set to 1 at the start of the iterative processing of S42 to S46. In addition, a continuation condition of iterative processing that j is less than or equal to N is set. In addition, the termination process of the iterative processing of incrementing j by 1 is set (S42).

Then, the confidence level calculation unit 140 calculates the integral value of the difference value between the function $f_i$ and the function $f_j$ as the confidence level $S_{ij}$ (S43). In a case where the confidence level $S_{ij}$ is less than or equal to the minimum value of $S_{ik}$ from k=1 to N (S44), the adjustment value determination unit 130B increments $C_j$ by 1 (S45), and causes the operation to proceed to S46.

When the operation proceeds to S46, j is incremented by 1, and if the continuation condition of the iterative processing that j is less than or equal to N is satisfied, the operation proceeds to S43. On the other hand, if the continuation condition of the iterative processing that i is less than or equal to N is not satisfied, the operation proceeds to S47. When the operation proceeds to S47, i is incremented by 1, and if the continuation condition of the iterative processing that i is less than or equal to N is satisfied, the operation proceeds to S42. On the other hand, if the continuation condition of the iterative processing that i is less than or equal to N is not satisfied, the operation proceeds to S48.

Then, the adjustment value determination unit 130B acquires the maximum value between $C_1$ and $C_N$ as k (S48). Then, Y that is a signal value after the image quality adjustment value γ is adjusted is obtained by the adjusted image quality adjustment value $γ_k$ (S49). This the adjusted image quality adjustment value $γ_k$ is applied to all of the cameras 20-1 to 20-N, so it is transmitted from the information processing device 10B to all of the cameras 20-1 to 20-N, and it is used for the image quality adjustment in all of the cameras 20-1 to 20-N. In addition, similarly to the updating of the matrix arithmetic operation, the maximum value between $C_1$ and $C_N$ may be used as the reference adjustment value.

Then, in a fourth example, a case where the image quality adjustment is performed using a function table obtained from each of different function forms (e.g., a plurality of exponential functions used for gamma correction, etc.) is described. FIG. 13 is a diagram illustrating an example of a function table obtained from each of different function forms. As illustrated in FIG. 13, in a case where the function form is different between a function f(y) and a function g(y), the correlation between an input value y, an output value f(y), and an output value g(y) is prepared in advance as a table. In the fourth example, this function table is used.

Figure 14:
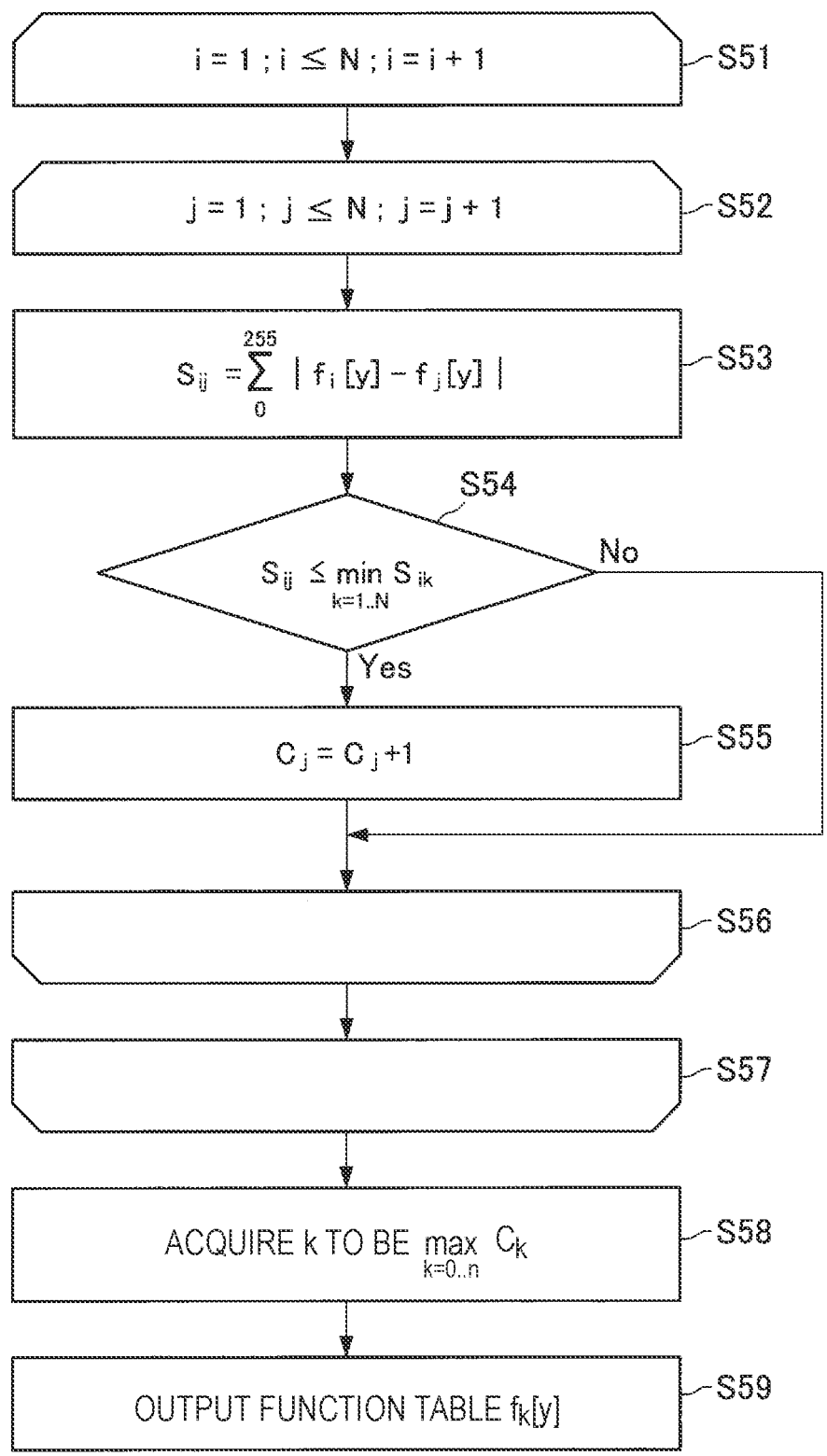
FIG. 14 is a flowchart illustrating a procedure of an operation of performing image quality adjustment using the function table.

FIG. 14 is a flowchart illustrating the procedure of the operation of performing the image quality adjustment using the function table. First, the variable i is set to 1 at the start of the iterative processing of S51 to S57. In addition, the continuation condition of the iterative processing that i is less than or equal to N is set. In addition, the termination process of the iterative processing of incrementing i by 1 is set (S51). Subsequently, the variable j is set to 1 at the start of the iterative processing of S52 to S56. In addition, the continuation condition of the iterative processing that j is less than or equal to N is set. In addition, the termination process of the iterative processing of incrementing j by 1 is set (S52).

Then, the confidence level calculation unit 140 calculates the integral value of the difference value between a function $f_i$ (y) and a function $f_j$ (y) as the confidence level $S_{ij}$ (S53). In the case where the confidence level $S_{ij}$ is less than or equal to the minimum value of $S_{ik}$ from k=1 to N (S54), the adjustment value determination unit 130B increments $C_j$ by 1 (S55), and causes the operation to proceed to S56.

When the operation proceeds to S56, j is incremented by 1, and if the continuation condition of the iterative processing that j is less than or equal to N is satisfied, the operation proceeds to S53. On the other hand, if the continuation condition of the iterative processing that i is less than or equal to N is not satisfied, the operation proceeds to S57. When the operation proceeds to S57, i is incremented by 1, and if the continuation condition of the iterative processing that i is less than or equal to N is satisfied, the operation proceeds to S52. On the other hand, if the continuation condition of the iterative processing that i is less than or equal to N is not satisfied, the operation proceeds to S58.

Then, the adjustment value determination unit 130B acquires the maximum value between $C_1$ and $C_N$ as k (S58). Then, a function table $f_k$ is obtained (S49). This function table $f_k$ is applied to all of the cameras 20-1 to 20-N, so it is transmitted from the information processing device 10B to all of the cameras 20-1 to 20-N, and it is used for the image quality adjustment in all of the cameras 20-1 to 20-N. In addition, similarly to the updating of the matrix arithmetic operation, the maximum value between $C_1$ and $C_N$ may be used as the reference adjustment value.

The first to fourth examples are described above. In the above description, the predetermined value regarding the calculation of the confidence level is not significantly changed, but the predetermined value regarding the calculation of the confidence level may be changed depending on the situation. In one example, in a case where a subject captured by each of the cameras 20-1 to 20-N is within an identical or similar range and the cameras 20-1 to 20-N whose wave-detection values exceed a predetermined range are detected, the predetermined value regarding the calculation of the confidence level of the detected camera may be changed.

In this event, the adjustment value determination unit 130B may determine whether the subject captured by each of the cameras 20-1 to 20-N is within an identical or similar range on the basis of the positions and attitudes of the cameras 20-1 to 20-N. More specifically, the adjustment value determination unit 130B calculates the optical axes of the cameras 20-1 to 20-N on the basis of the positions and attitudes of the cameras 20-1 to 20-N, and if there is a case where the points on the optical axes of the cameras 20-1 to 20-N fall within a predetermined space, the adjustment value determination unit 130B may determines that the subject captured by the cameras 20-1 to 20-N is within an identical or similar range.

Figure 15:
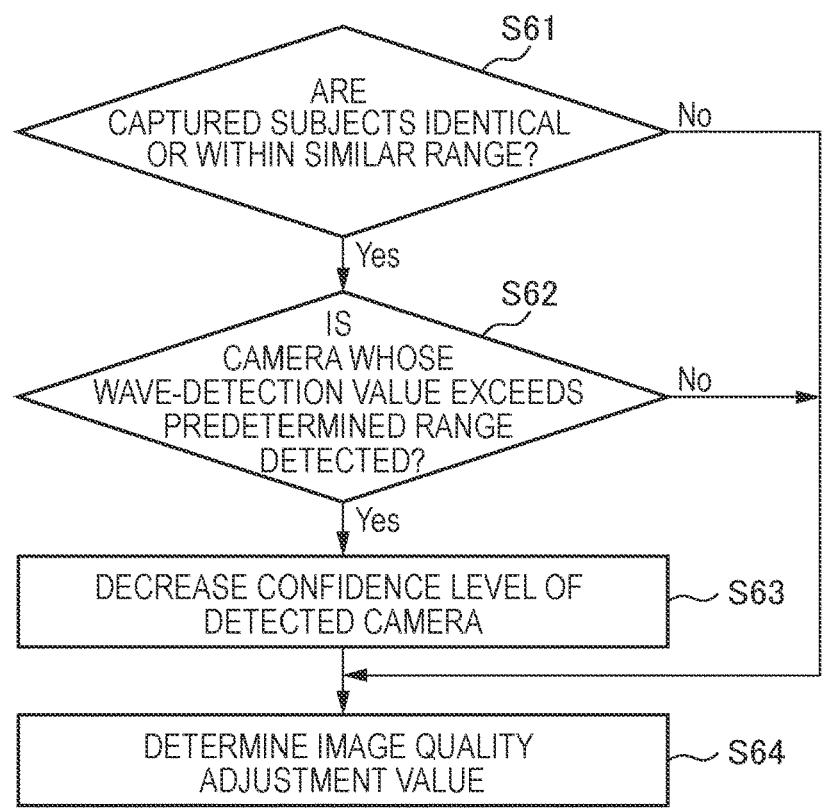
FIG. 15 is a flowchart illustrating an example of an operation of decreasing the confidence level of a detected camera.

In one example, in the case where the subject captured by each of the cameras 20-1 to 20-N is within an identical or similar range and the cameras 20-1 to 20-N whose wave-detection values exceed the predetermined range are detected, the confidence level calculation unit 140 may decrease the confidence level in the detected cameras. FIG. 15 is a flowchart illustrating an example of the operation of decreasing the confidence level in the detected camera.

As illustrated in FIG. 15, in the case where the respective subject captured by the cameras 20-1 to 20-N are not identical or are not within a similar range ("No" in S61), the confidence level calculation unit 140 causes the operation to proceed to S64. On the other hand, in the case where the respective subject captured by the cameras 20-1 to 20-N are identical or within a similar range ("Yes" in S61), the confidence level calculation unit 140 causes the operation to proceed to S62.

When the operation proceeds to S62, if no camera whose wave-detection value exceeds the predetermined range is detected ("No" in S62), the confidence level calculation unit 140 causes the operation to proceed to S64. On the other hand, if a camera whose wave-detection value exceeds the predetermined range is detected ("Yes" in S62), the confidence level calculation unit 140 decreases the confidence level of the detected camera (S63), and proceeds to S64. When the operation proceeds to S64, the confidence level calculation unit 140 determines the adjusted image quality adjustment value using the decreased confidence level (S64).

Figure 16:
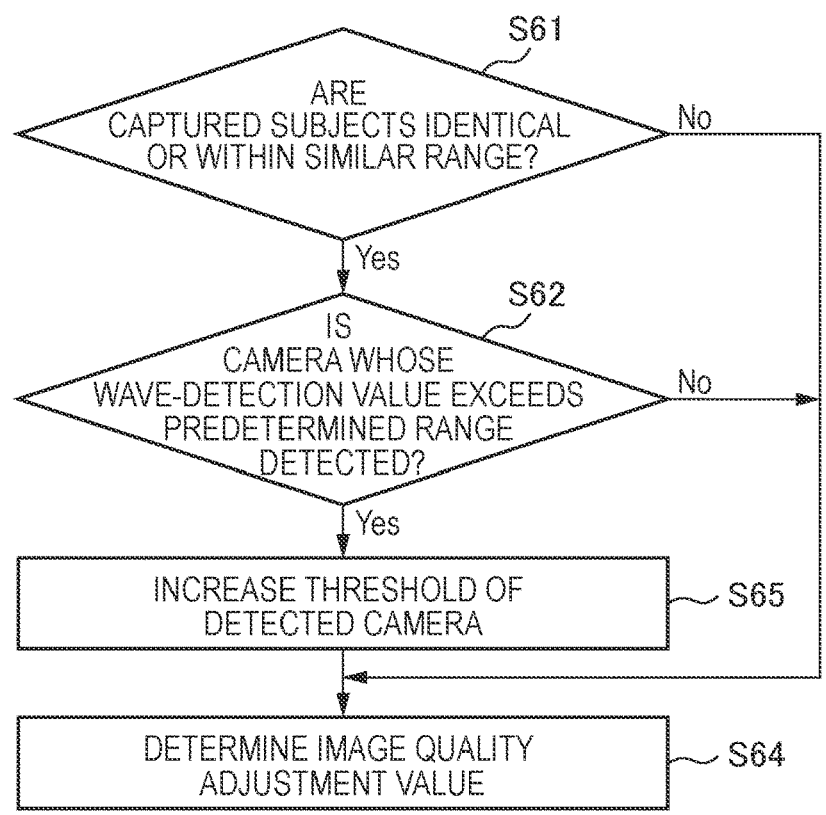
FIG. 16 is a flowchart illustrating an example of an operation of increasing a threshold of a detected camera.

Further, in one example, in the case where the subject captured by each of the cameras 20-1 to 20-N is within an identical similar range and the case where the camera 20-1 to 20-N whose wave-detection value exceed the predetermined range are detected, the confidence level calculation unit 140 may increase the threshold of the detected camera. FIG. 16 is a flowchart illustrating an example of an operation of increasing the threshold of the detected camera.

As illustrated in FIG. 16, in the case where the respective subject captured by the cameras 20-1 to 20-N are not identical or are not within a similar range ("No" in S61), the confidence level calculation unit 140 causes the operation to proceed to S64. On the other hand, in the case where the respective subject captured by the cameras 20-1 to 20-N are identical or within a similar range ("Yes" in S61), the confidence level calculation unit 140 causes the operation to proceed to S62.

When the operation proceeds to S62, if no camera whose wave-detection value exceeds the predetermined range is detected ("No" in S62), the confidence level calculation unit 140 causes the operation to proceed to S64. On the other hand, if a camera whose wave-detection value exceeds the predetermined range is detected ("Yes" in S62), the confidence level calculation unit 140 increases the threshold of the detected camera (S65) and proceeds to S64. When the operation proceeds to S64, the confidence level calculation unit 140 determines the adjusted image quality adjustment value using the increased threshold (S64).

Then, an example of the overall operation of the information processing system according to the second embodiment of the present disclosure is described. FIG. 17 is a flowchart illustrating an example of the overall operation of the information processing system according to the second embodiment of the present disclosure. As illustrated in FIG. 17, the cameras 20-1 to 20-N perform the wave-detection and the arithmetic operation of image quality adjustment values (S71). Subsequently, the cameras 20-1 to 20-N transmit wave-detection values and unadjusted image quality adjustment values via a transmission channel (S72).

The information processing device 10B, when receiving the wave-detection value and the image quality adjustment value, performs arithmetic operation of the confidence level (S73), determines the magnitude relation between the confidence level and the threshold (S74), and so calculates the adjusted image quality adjustment value on the basis of the determination result (S75). Subsequently, the information processing device 10B transmits the adjusted image quality adjustment value to the cameras 20-1 to 20-N via the transmission channel (S76), and the cameras 20-1 to 20-N, when receiving the adjusted image quality adjustment value, sets the image quality adjustment value on the basis of the adjusted image quality adjustment value (S77). Subsequently, the iterative execution of S71 to S77 is performed.

4. Hardware Configuration Example

Next, with reference to FIG. 18, a hardware configuration of the information processing device 10 according to the embodiment of the present disclosure will be described. FIG. 18 is a block diagram illustrating the hardware configuration example of the information processing device 10 according to the embodiment of the present disclosure.

As illustrated in FIG. 18, the information processing device 10 includes a central processing unit (CPU) 901, a read only memory (ROM) 903, and a random access memory (RAM) 905. In addition, the information processing device 10 may include a host bus 907, a bridge 909, an external bus 911, an interface 913, an input device 915, an output device 917, a storage device 919, a drive 921, a connection port 923, and a communication device 925. The information processing device 10 may include processing circuits such as those called digital signal processors (DSPs) or application specific integrated circuits (ASICs), alternatively or in addition to the CPU 901.

The CPU 901 functions as an arithmetic operation processing device and a control device, and controls some or all of the operations in the information processing device 10 in accordance with various programs recorded in the ROM 903, the RAM 905, the storage device 919, or a removable recording medium 927. The ROM 903 stores programs, arithmetic operation parameters, and the like used by the CPU 901. The RAM 905 temporarily stores programs used in the execution of the CPU 901 and stores parameters that change as appropriate in the execution. The CPU 901, the ROM 903, and the RAM 905 are connected to each other via the host bus 907 including an internal bus such as a CPU bus. In addition, the host bus 907 is connected to the external bus 911 such as a peripheral component interconnect/interface (PCI) bus via the bridge 909.

The input device 915 is a device operated by a user, such as a mouse, a keyboard, a touchscreen, a button, a switch, and a lever. The input device 915 may include a microphone that detects voice of the user. The input device 915 may be, in one example, a remote control device using infrared rays or other types of radio waves. Alternatively, the input device 915 may be an external connection device 929, such as a mobile phone, compatible with an operation of the information processing device 10. The input device 915 includes an input control circuit that generates an input signal on the basis of information input by the user and outputs the generated input signal to the CPU 901. The user inputs various types of data to the information processing device 10 or instructs the information processing device 10 to perform a processing operation by operating the input device 915. In addition, the imaging device 933 to be described later can also function as the input device by capturing the movement of the user's hand, the user's finger, or the like. In this case, the pointing position may be determined depending on the movement of the hand or the direction of the finger.

The output device 917 includes a device capable of notifying the user of the acquired information visually or audibly. The output device 917 may be, in one example, a display device such as liquid crystal displays (LCDs), plasma display panels (PDPs), organic electro-luminescence (EL) displays, and projectors, or a hologram display device, an audio output device such as speakers and headphones, or a printer. The output device 917 outputs a result obtained by the processing performed by the information processing device 10 as video such as text or an image or as audio such as voice and sound. In addition, the output device 917 may include a light or the like to light the surroundings.

The storage device 919 is a device for data storage that is configured as an example of the storage unit of the information processing device 10. Examples of the storage device 919 include a magnetic storage unit device such as hard disk drives (HDDs), a semiconductor storage device, an optical storage device, and a magneto-optical storage device. The storage unit 919 stores programs or various data to be executed by the CPU 901, various data acquired from the outside, or the like.

The drive 921 is a reader/writer for the removable recording medium 927 such as a magnetic disk, an optical disc, a magneto-optical disk, and a semiconductor memory, and the drive 921 is built in the information processing device 10 or attached externally thereto. The drive 921 reads out information recorded on the loaded removable recording medium 927 and outputs the information to the RAM 905. In addition, the drive 921 writes in the removable recording medium 927 loaded thereon.

The connection port 923 is a port used to allow a device to directly connect to the information processing device 10. The connection port 923 may be, in one example, a universal serial bus (USB) port, an IEEE1394 port, and a small computer system interface (SCSI) port, or the like. In addition, the connection port 923 may be an RS-232C port, an optical audio terminal, a high-definition multimedia interface (HDMI, registered trademark) port, or the like. The connection of the external connection device 929 to the connection port 923 enables various data exchange between the information processing device 10 and the external connection device 929.

The communication device 925 is, in one example, a communication interface including a communication device or the like for establishing a connection to the communication network 931. The communication device 925 may be, in one example, a wired or wireless local area network (LAN), Bluetooth (registered trademark), or a communication card for a wireless USB (WUSB). In addition, the communication device 925 may also be a router for optical communication, a router for asymmetric digital subscriber line (ADSL), a modem for various kinds of communication, or the like. The communication device 925 transmits and receives a signal or the like to and from the Internet or other communication devices, in one example, by using a predetermined protocol such as TCP/IP. In addition, the communication network 931 to which the communication device 925 connects is a network established through wired or wireless connection, and is, in one example, the Internet, a home network, infrared communication, radio wave communication, satellite communication, or the like.

An example of the hardware configuration of the information processing device 10 is described above.

2. Concluding Remarks

According to the embodiment of the present disclosure as described above, the information processing device 10A including the adjustment value determination unit 130A, which determines, on the basis of a first image quality adjustment value of each of the cameras 20-1 to 20-N that is acquired from the cameras 20-1 to 20-N and the confidence level of each of the cameras, a second image quality adjustment value of each of the cameras 20-1 to 20-N, is provided. Such a configuration makes it possible to improve the accuracy of image quality adjustment of each of the cameras 20-1 to 20-N.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including: an adjustment value determination unit configured to determine a second image quality adjustment value of each of a plurality of cameras on a basis of a first image quality adjustment value of each of the plurality of cameras and a confidence level of each of the plurality of cameras that are acquired from each of the plurality of cameras.

(2)

The information processing device according to (1), including: a confidence level calculation unit configured to calculate the confidence level on a basis of the first image quality adjustment value.

(3)

The information processing device according to (2), in which the confidence level calculation unit calculates a difference value between the first image quality adjustment value and a predetermined reference adjustment value for each of the cameras as the confidence level.

(4)

The information processing device according to (3), in which the adjustment value determination unit determines the second image quality adjustment value as the reference adjustment value in a case where the confidence level exceeds a predetermined threshold.

(5)

The information processing device according to (4), in which the adjustment value determination unit determines the second image quality adjustment value as the first image quality adjustment value in a case where the difference value does not exceed the threshold.

(6)

The information processing device according to any one of (3) to (5), in which the reference adjustment value is a predetermined representative value regarding one or a plurality of cameras excluding a camera using the reference adjustment value for calculating the confidence level among the plurality of cameras.

(7)

The information processing device according to (6), in which the representative value is an intermediate value, an average value, a minimum value, or a maximum value regarding one or a plurality of cameras excluding the camera using the reference adjustment value for calculating the confidence level among the plurality of cameras.

(8)

The information processing device according to (2), in which, in a case where the first image quality adjustment value is given as a matrix, the confidence level calculation unit calculates the confidence level by calculating a difference value between results obtained by multiplying the matrix by a predetermined vector with respect to all combinations of the matrix.

(9)

The information processing device according to (2), in which, in a case where the first image quality adjustment value is given as a function, the confidence level calculation unit calculates the confidence level by calculating an integral value of difference values between the functions with respect to all combinations of the function.

(10)

The information processing device according to (2), in which, in a case where the first image quality adjustment value is given as a combination of a plurality of values, the confidence level calculation unit calculates the confidence level by calculating a total value of difference values between values associated with each other with respect to all the combinations.

(11)

The information processing device according to (4) or (5), in which, in a case where respective subjects captured by the plurality of cameras are identical or within a similar range and a camera whose wave-detection value exceeds a predetermined range is detected as a detected camera, the confidence level calculation unit changes a predetermined value regarding calculation of the confidence value regarding the detected camera.

(12)

The information processing device according to (11), in which the confidence level calculation unit decreases the confidence level of the detected camera.

(13)

The information processing device according to (11), in which the confidence level calculation unit increases the threshold of the detected camera.

(14)

The information processing device according to any one of (11) to (13), in which the adjustment value determination unit determines whether the respective subjects captured by the plurality of cameras is identical or within a similar range on a basis of positions and attitudes of the plurality of cameras.

(15)

The information processing device according to (1), including:
a confidence level acquisition unit configured to acquire a confidence level of each of the plurality of cameras.

(16)

The information processing device according to (15), in which the adjustment value determination unit determines the first image quality adjustment value of a camera whose confidence level is highest as the second image quality adjustment value of each of the plurality of cameras.

(17)

The information processing device according to any one of (1) to (16), in which the first image quality adjustment value includes a value regarding at least any one of white balance, matrix arithmetic operation, aperture stop, gain, gamma correction, knee correction, contour emphasis, and noise reduction of an image captured by the camera.

(18)

An information processing method including:
determining a second image quality adjustment value of each of a plurality of cameras on a basis of a first image quality adjustment value of each of the plurality of cameras and a confidence level of each of the plurality of cameras that are acquired from each of the plurality of cameras.

(19)

A program causing a computer to function as an information processing device including:
an adjustment value determination unit configured to determine a second image quality adjustment value of each of a plurality of cameras on a basis of a first image quality adjustment value of each of the plurality of cameras and a confidence level of each of the plurality of cameras that are acquired from each of the plurality of cameras.

(20)

An information processing system including:
a plurality of cameras; and
an information processing device including an adjustment value determination unit configured to determine a second image quality adjustment value of each of the plurality of cameras on a basis of a first image quality adjustment value of each of the plurality of cameras and a confidence level of each of the plurality of cameras that are acquired from each of the plurality of cameras.

REFERENCE SIGNS LIST 1 information processing system
10 (10A, 10B) information processing device
110A, 110B data acquisition unit
120 confidence level acquisition unit
130A, 130B adjustment value determination unit
140 confidence level calculation unit
20 camera
210 lens
230 imager
240 control device
250 pre-processing unit
260 wave-detection unit
271 adjustment value arithmetic operation and lens control unit
272 adjustment value selection unit
273 adjustment value selection unit
274 image quality adjustment unit
280 post-processing unit
290 display unit

The invention claimed is:

1. An information processing device, comprising:
a central processing unit (CPU) configured to:
acquire a first image quality adjustment value of each camera of a plurality of cameras;
calculate a confidence level of each camera of the plurality of cameras based on the first image quality adjustment value;
determine a plurality of subjects captured by the plurality of cameras is one of identical to one another or within a specific space, wherein each camera of the plurality of cameras captures a respective subject of the plurality of subjects;

detect a first camera of the plurality of cameras, wherein a wave-detection value of the first camera exceeds a first threshold value;

change a specific value, associated with the confidence level of the first camera, based on
the determination that the plurality of subjects is one of identical to one another or within the specific space, and
the detection of the first camera;

determine a second image quality adjustment value for each camera of the plurality of cameras based on the changed specific value, the first image quality adjustment value of each camera of the plurality of cameras, and the confidence level of each camera of the plurality of cameras; and output the second image quality adjustment value to each camera of the plurality of cameras.

2. The information processing device according to claim 1, wherein the CPU is further configured to calculate, for each of the plurality of cameras, a difference value of a difference between the first image quality adjustment value and a reference adjustment value as the confidence level.

3. The information processing device according to claim 2, wherein the CPU is further configured to determine the second image quality adjustment value as the reference adjustment value based on the confidence level that exceeds a second threshold value.

4. The information processing device according to claim 3, wherein the CPU is further configured to determine the second image quality adjustment value as the first image quality adjustment value based on the difference value being less than the second threshold value.

5. The information processing device according to claim 2, wherein
the reference adjustment value is a representative value regarding at least one of the plurality of cameras excluding a second camera of the plurality of cameras, and
the second camera utilizes the reference adjustment value for the calculation of the confidence level.

6. The information processing device according to claim 5, wherein the representative value is one of an intermediate value, an average value, a minimum value, or a maximum value regarding at least one of the plurality of cameras excluding the second camera.

7. The information processing device according to claim 1, wherein
the first image quality adjustment value is a matrix, and
the CPU is further configured to:
calculate a difference value of a difference between a plurality of results, wherein the plurality of results is obtained by multiplication of the matrix by a specific vector; and
calculate the confidence level based on the difference value of the difference between the plurality of results.

8. The information processing device according to claim 1, wherein
the first image quality adjustment value corresponds to a plurality of functions, and
the CPU is further configured to:
calculate an integral value of a plurality of difference values, wherein the plurality of difference values corresponds to a plurality of differences between the plurality of functions with respect to a plurality of combinations of the plurality of functions; and
calculate the confidence level based on the integral value.

9. The information processing device according to claim 1, wherein
the first image quality adjustment value is a combination of a plurality of values, and
the CPU is further configured to:
calculate a total value of a plurality of difference values, wherein
the plurality of difference values corresponds to a plurality of differences,
the plurality of differences is between the plurality of values, and
the plurality of differences is based on the plurality of specific values being associated with one another with respect to a plurality of combinations of the plurality of values; and
calculate the confidence level based on the total value.

10. The information processing device according to claim 1, wherein the CPU is further configured to decrease the confidence level of the first camera.

11. The information processing device according to claim 3, wherein the CPU is further configured to increase the second threshold value of the first camera.

12. The information processing device according to claim 1, wherein the CPU is further configured to determine the plurality of subjects is one of identical to one another or within the specific space based on a plurality of positions of the plurality of cameras and a plurality of attitudes of the plurality of cameras.

13. The information processing device according to claim 1, wherein
the CPU is further configured to determine the first image quality adjustment value of a second camera of the plurality of cameras as the second image quality adjustment value of each camera of the plurality of cameras, and
the confidence level of the second camera is highest among the plurality of cameras.

14. The information processing device according to claim 1, wherein the first image quality adjustment value includes at least one of a white balance value, a matrix arithmetic operation value, an aperture stop value, a gain value, a gamma correction value, a knee correction value, a contour emphasis value, or a noise reduction value of an image captured by a second camera of the plurality of cameras.

15. An information processing method, comprising:
acquiring a first image quality adjustment value of each camera of a plurality of cameras;
calculating a confidence level of each camera of the plurality of cameras based on the first image quality adjustment value;
determining a plurality of subjects captured by the plurality of cameras is one of identical to one another or within a specific space, wherein each camera of the plurality of cameras captures a respective subject of the plurality of subjects;
detecting a specific camera of the plurality of cameras, wherein a wave-detection value of the specific camera exceeds a threshold value;
changing a specific value, associated with the confidence level of the specific camera, based on
the determination that the plurality of subjects is one of identical to one another or within the specific space, and the detection of the specific camera;
determining a second image quality adjustment value for each camera of the plurality of cameras based on the changed specific value, the first image quality adjustment value of each camera of the plurality of cameras, and the confidence level of each camera of the plurality of cameras; and
outputting the second image quality adjustment value to each camera of the plurality of cameras.

16. A non-transitory computer-readable medium having stored thereon computer-executable instructions which, when executed by a processor, cause the processor to execute operations, the operations comprising:
acquiring a first image quality adjustment value of each camera of a plurality of cameras;
calculating a confidence level of each camera of the plurality of cameras based on the first image quality adjustment value;
determining a plurality of subjects captured by the plurality of cameras is one of identical to one another or within a specific space, wherein each camera of the plurality of cameras captures a respective subject of the plurality of subjects;
detecting a specific camera of the plurality of cameras, wherein a wave-detection value of the specific camera exceeds a threshold value;
changing a specific value, associated with the confidence level of the specific camera, based on
the determination that the plurality of subjects is one of identical to one another or within the specific space, and
the detection of the specific camera;
determining a second image quality adjustment value for each camera of the plurality of cameras based on the changed specific value, the first image quality adjustment value of each camera of the plurality of cameras, and the confidence level of each camera of the plurality of cameras; and
outputting the second image quality adjustment value to each camera of the plurality of cameras.

17. An information processing system, comprising:
a plurality of cameras, wherein each camera of the plurality of cameras is configured to capture a respective subject of a plurality of subjects; and
an information processing device including a central processing unit (CPU) configured to:
acquire a first image quality adjustment value of each camera of the plurality of cameras;
calculate a confidence level of each camera of the plurality of cameras based on the first image quality adjustment value;
determine the plurality of subjects is one of identical to one another or within a specific space;
detect a specific camera of the plurality of cameras, wherein a wave-detection value of the specific camera exceeds a threshold value;
change a specific value, associated with the confidence level of the specific camera, based on
the determination that the plurality of subjects is one of identical to one another or within the specific space, and
the detection of the specific camera;
determine a second image quality adjustment value for each camera of the plurality of cameras based on the changed specific value, the first image quality adjustment value of each camera of the plurality of cameras; and the confidence level of each camera of the plurality of cameras; and
output the second image quality adjustment value to each camera of the plurality of cameras.

* * * * *